(12) United States Patent
Bakker et al.

(10) Patent No.: US 9,285,491 B2
(45) Date of Patent: Mar. 15, 2016

(54) SEISMIC P-WAVE MODELLING IN AN INHOMOGENEOUS TRANSVERSELY ISOTROPIC MEDIUM WITH A TILTED SYMMETRY AXIS

(75) Inventors: Petrus Maria Bakker, Rijswijk (NL); Eric Jens Duveneck, Rijswijk (NL)

(73) Assignee: Shell Oil Company, Houston, TX (US)

( * ) Notice: Subject to any disclaimer, the term of this patent is extended or adjusted under 35 U.S.C. 154(b) by 713 days.

(21) Appl. No.: 13/697,433

(22) PCT Filed: May 10, 2011

(86) PCT No.: PCT/EP2011/057458
§ 371 (c)(1),
(2), (4) Date: Nov. 12, 2012

(87) PCT Pub. No.: WO2011/141440
PCT Pub. Date: Nov. 17, 2011

(65) Prior Publication Data
US 2013/0060544 A1 Mar. 7, 2013

(30) Foreign Application Priority Data
May 12, 2010 (EP) .................................... 10162694

(51) Int. Cl.
*G01V 1/28* (2006.01)
(52) U.S. Cl.
CPC .............. *G01V 1/28* (2013.01); *G01V 2210/67* (2013.01); *G01V 2210/673* (2013.01); *G01V 2210/679* (2013.01)
(58) Field of Classification Search
None
See application file for complete search history.

(56) References Cited

U.S. PATENT DOCUMENTS

| 4,373,197 A | * | 2/1983 | Gassaway | .............. | G01V 1/284 |
| | | | | | 367/36 |
| 5,136,551 A | * | 8/1992 | Armitage | ............. | B01D 53/343 |
| | | | | | 367/38 |

(Continued)

FOREIGN PATENT DOCUMENTS

| WO | WO2009092025 | 7/2009 |
| WO | WO2010014379 | 2/2010 |

OTHER PUBLICATIONS

E. E Duveneck, P. Milcik, P. M. Bakker, "Acoustic VTI wave equations and their application for anisotropic reverse-time migration", pp. 2186-2190, 2008.*

(Continued)

*Primary Examiner* — Kibrom K Gebresilassie

(57) ABSTRACT

An improved method for P-wave modeling in inhomogeneous transversely isotropic media with tilted symmetry axis (TTI media), suitable for anisotropic reverse-time migration, is based on an acoustic TI approximation. The resulting wave equations (2.20) & (2.21) are derived directly from first principles, Hooke's law and the equations of motion, and therefore make no assumptions on spatial variation of medium parameters. Like in the acoustic VTI case, the wave equations are written as a set of two second-order partial differential equations. However, unlike in the acoustic VTI case, the acoustic TTI wave equations contain mixed second-order derivatives. The discretization scheme uses centered finite-difference operators for first- and second-order derivative operators to approximate the mixed and non-mixed second-order derivatives in the wave equation. The discretization scheme is stabilized by slightly weighing down the mixed derivatives, with almost negligible effect on the wave field kinematics.

15 Claims, 4 Drawing Sheets

Qualitative graphs of (a) $\lambda^{(1)}(\kappa)$, (b) $\{\lambda^{(1)}(\kappa)\}^2$, and (c) $-\lambda^{(2)}(\kappa)$.

(56) References Cited

U.S. PATENT DOCUMENTS

| | | | | |
|---|---|---|---|---|
| 6,999,880 | B2* | 2/2006 | Lee | G01V 1/30 702/13 |
| 8,040,754 | B1* | 10/2011 | Hardage | G01V 1/284 367/37 |
| 8,194,498 | B2* | 6/2012 | Du | G01V 1/28 367/73 |
| 2004/0196738 | A1* | 10/2004 | Tal-Ezer | G01V 1/28 367/51 |
| 2006/0190179 | A1* | 8/2006 | Herrmann | G01V 1/28 702/14 |
| 2007/0168167 | A1* | 7/2007 | Lou | G01V 1/305 703/5 |
| 2009/0213693 | A1* | 8/2009 | Du | G01V 1/28 367/73 |
| 2010/0135115 | A1* | 6/2010 | Sun | G01V 1/303 367/75 |
| 2012/0051177 | A1* | 3/2012 | Hardage | G01V 1/286 367/43 |
| 2012/0263015 | A1* | 10/2012 | Zhang | G01V 1/30 367/38 |
| 2013/0177035 | A1* | 7/2013 | Kyono | H01S 5/3213 372/45.01 |
| 2015/0235081 | A1* | 8/2015 | Jiang | G06K 9/00476 382/109 |

OTHER PUBLICATIONS

Zhang, Y, et al; "A Stable TTI Reverse Time Migration and Its Implementation"; SEG; Expanded Abstracts 28, pp. 2794-2796; Jan. 1, 2009.
Correa, G.J.P., et al.; Centered and Staggered Fourier Derivatives and Hilbert Transforms; Geophysics, 67; pp. 1558-1563; 2002.
Du, X. et al.; "Anisotropic Reverse-Time Migration for Tilted TI Media"; Geophysical Prospecting, 55; pp. 853-869;2007.
Du, X. et al.; "A New Pseudo-acoustic Wave Equation for VTI Media"; $70^{th}$ EAGE Conference & Exhibition; Expanded Abstracts, HO33; 2008.
Duveneck, E. et al.; "Acoustic VTI Wave Equations and Their Application for Anisotropic Reverse-time Migration"; $78^{th}$ Ann. Int. Meeting; SEG; Expanded Abstracts; pp. 2186-2190; 2008.
Fletcher, R.P. et al.; "A New Pseudo-acoustic Wave Equation for TI Media;" $78^{th}$ Ann. Int. Meeting; SEG; Expanded Abstracts; pp. 2082-2086; 2008.
Grechka, V. et al.; "Shear Waves in Acoustic Anisotropic Media";Geophysics, 69; pp. 576-582; 2004.
Hestholm, S.; "Acoustic VTI Modelling Using High-order Finite Differences"; $77^{th}$ Annual Meeting, SEG, Expanded Abstracts; pp. 139-143; 2007.
Igel, H. et al.; "Anisotropic Wave Propagation Through Finite-difference Grids"; Geophysics, 60; pp. 1203-1216; 1995.
Klie, H et al.; "A New Acoustic Wave Equation for Modelling in Anisotropic Media"; $71^{st}$ Annual Meeting, SEG; Expanded Abstracts; pp. 1171-1174; 2001.
Fornberg, B.; The Pseudospectral Method: Comparisons with Finite Differences for the Elastic Wave Equation; Geophysics, 52; pp. 483-501; 1987.
Lesage, A.C. et al.; "Hybrid Finite-difference-pseudospectral Method for 3D RTM in TTI Media"; $70^{th}$ EAGE Conference & Exhibition; Extended Abstracts; F042, 2008.
Liu, W. et al.; "Stable Reverse-time Migration in Variable-tilt TI Media"; $71^{st}$ EAGE Conference & Exhibition; Extended Abstracts; p. 064; 2009.
Saenger, E et al.; "Finite-difference Modeling of Viscoelastic and Anisotropic Wave Propagation Using the Rotated Staggered Grid"; Geophysics, 69; p. 583-591; 2004
Sarkar, D. et al; "Anisotropic Inversion of Seismic Data for Stressed Media Theory and a Physical Modeling Study on Berea Sandstone"; Geophysics, Society of Exploration Geophysicists, vol. 68, No. 2; pp. 690-704; Mar. 1, 2003.
Zhang, L et al.; "An Acoustic Wave Equation for Modelling in Tilted TI Media"; $73^{rd}$ Annual Meeting, SEG, Expanded Abstracts; pp. 153-156; 2003.
Zhang, L et al.; "Reverse Time Migration in Tilted Transversely Isotropic Media"; J. Seis. Explor., 13; pp. 173-188; 2004.
Zhang, L et al; "Finite-difference Modelling of Wave Propagation in Acoustic Tilted TI Media"; Geoph. Prosp., 53; pp. 843-852; 2005.
Zhang, H et al; "Reverse Time Migration in 3D Heterogeneous TTI Media"; $78^{th}$ Ann. Int. Meeting, SEG; Expanded Abstracts; pp. 2196-2200; 2008.
Zhou, H et al.;"An Anisotropic Wave Equation for VTI Media"; $68^{th}$ Conference and Exhibition; EAGE; Extended Abstracts, H033; 2006a.
Zhou, H et al.; "An Anisotropic Acoustic Wave Equation for Modeling and Migration in 2D TTI Media"; $76^{th}$ Ann. Int. Meeting, SEG; Expanded Abstracts; pp. 194-198; 2006b.
Alkhalifah, T et al.; "A Transversely Isotropic Mediu with a Tilted Symmetry Axis Normal to the Reflector"; Geophysics; Society of Exploration Geophysicists; vol. 75, No. 3; pp. A19-A24; May 1, 2010.
Thomsen, L.; "Weak Elastic Anisotropy"; Geophysics, vol. 51 No. 10; pp. 1954-1966; Oct. 1986.
Fletcher, DU, et al.; "Reverse Time Migration in Tilted Transversely Isotropic (TTI) Media"; Geophysics, Society of Exploration Geophysicists, vol. 74, No. Supple. of 6, pp. WCA179-WCA-187; Nov. 1, 2009.
Fowler, P.J et al.; "Coupled Equations for Reverse-time Migration in Transversely Isotropic Media"; Geophysics, 75, pp. S11-S22; 2010.
Alkiialifaii, T; "Acoustic Approximations for Processing in Transversely Isotopic Media"; Geophysics, 63; pp. 623-631; 1998.
Alkhalifah, T.; "An Acoustic Wave Equation for Anisotropic Media"; Geophysics; Society of Exploration Geophysicists;, vol. 65, No. 4; pp. 1239-1250; Jul. 1, 2000.
Bloor, R., et al.; "Sub-salt Imaging in VTI Media with Common-Shot Reverse-time Migration"; SEG/EAGE Summer Research Workshop; 2006.
Cerjan, C., et al.; "A Nonreflecting Boundary Condition for Discrete Acoustic and Elastic Wave Equations"; Geophysics, 50; pp. 705-708; 1985.
Collino, F., et al.; "The Perfectly Matched Absorbing Layer Model to the Linear Elastodynamic Problem in Anisotropic Heterogeneous Media"; Geophysics, 66; pp. 294-307; 2001.

\* cited by examiner

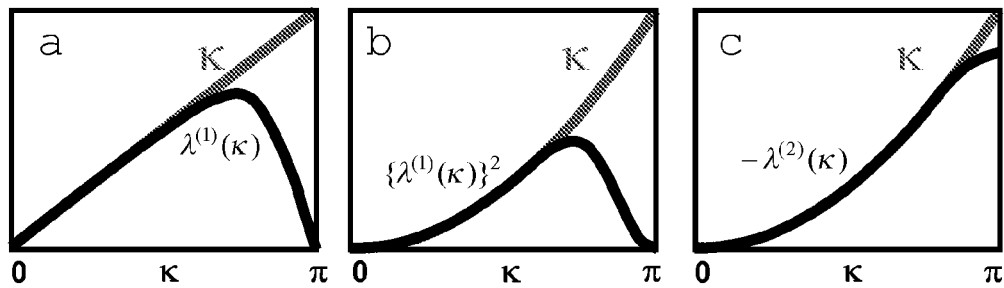
Figure 1: Qualitative graphs of (a) $\lambda^{(1)}(\kappa)$, (b) $\{\lambda^{(1)}(\kappa)\}^2$, and (c) $-\lambda^{(2)}(\kappa)$.
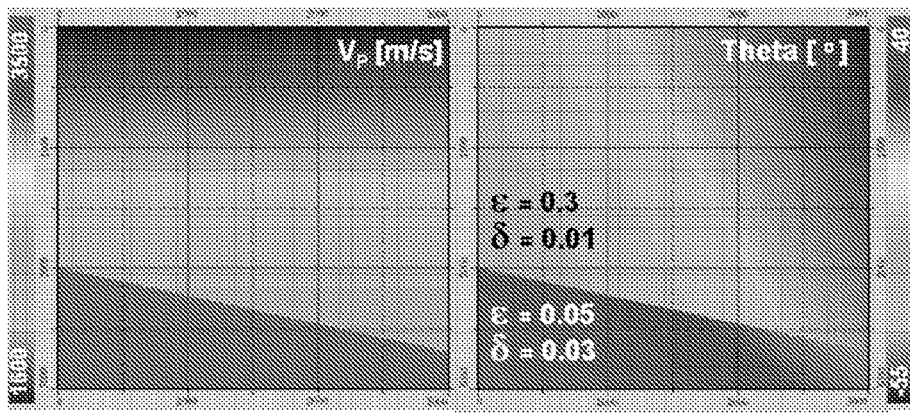
Figure 2: Two-layer anisotropic velocity model with spatially varying anisotropic symmetry axis.

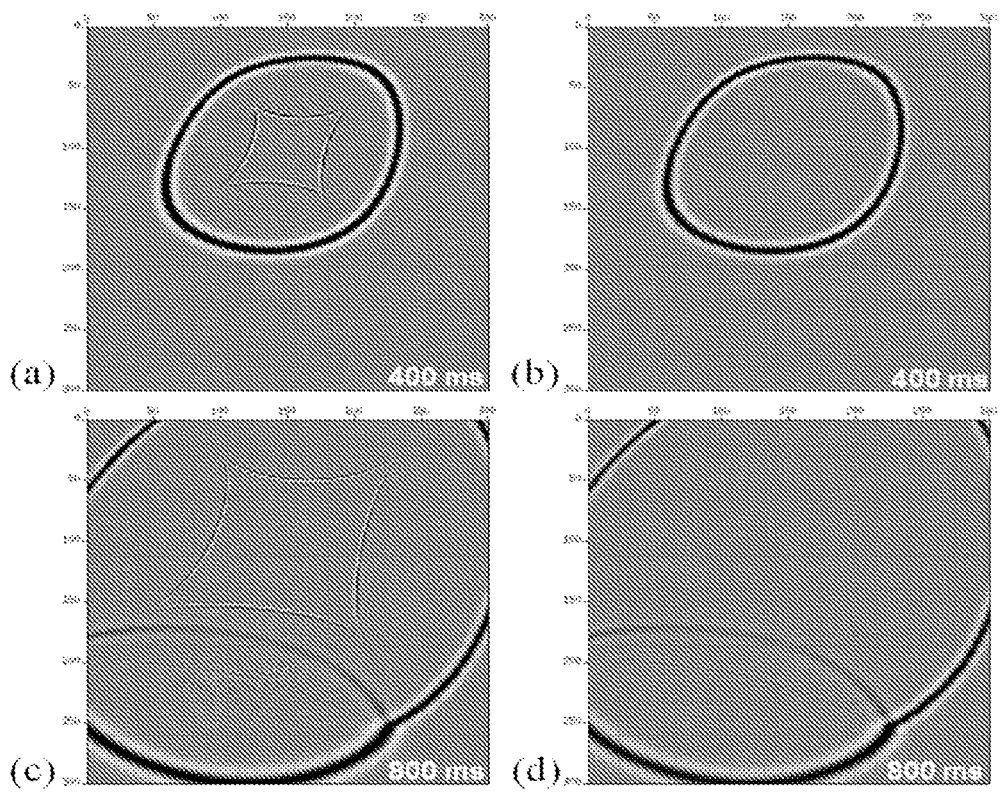
Figure 3: Wave field snapshots obtained by finite-difference modeling according to the invention, based on new equations (2.20) and (2.21) in the anisotropic velocity model of Figure 2.

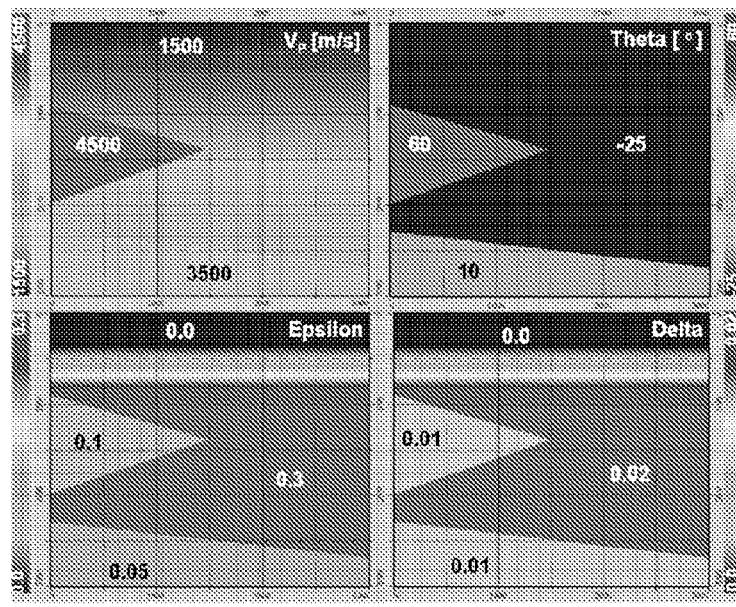
Figure 4: Anisotropic velocity model with large contrasts in all medium parameters.
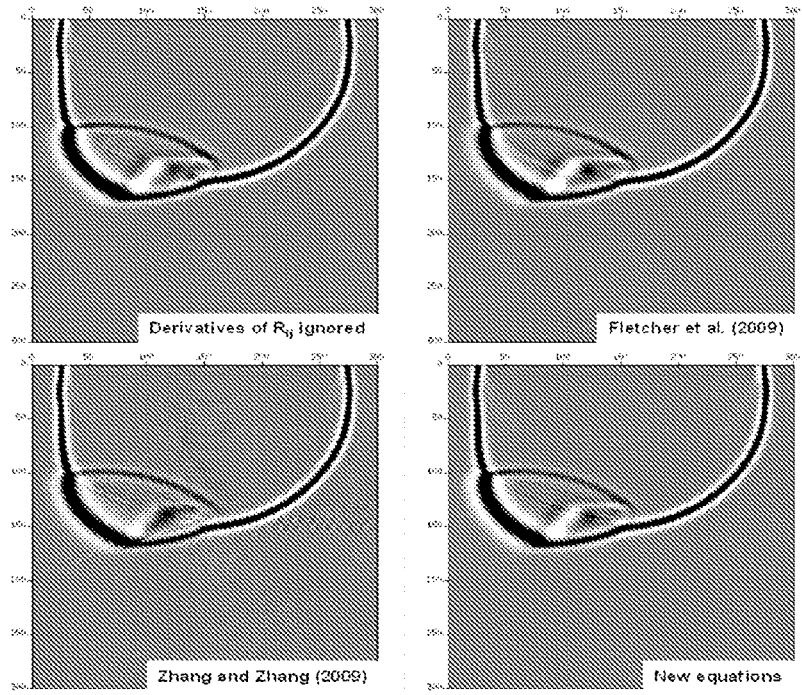
Figure 5: Wave-field snapshots ($\sigma'_V$) at t = 0.8s, computed in the anisotropic velocity model of Figure 4, using four different TTI wave equations.

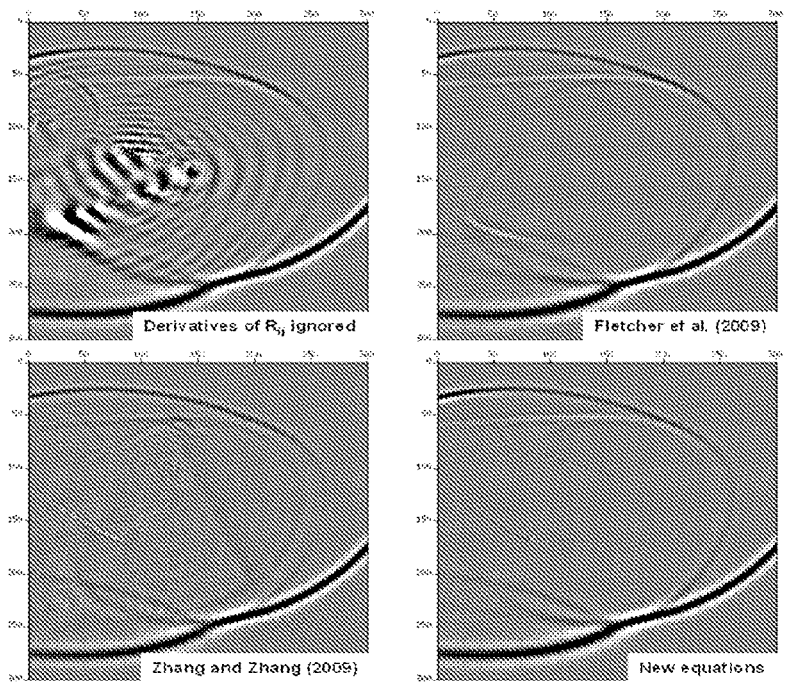
Figure 6: Wave-field snapshots ($\sigma'_V$) at t = 1.2s using four different TTI wave equations.
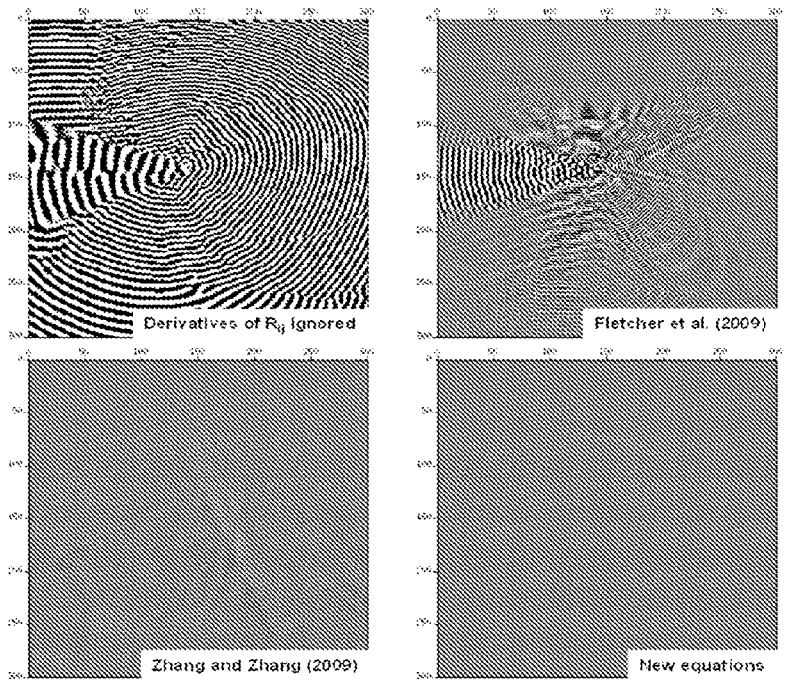
Figure 7: Wave-field snapshots ($\sigma'_V$) at t = 4s using four different TTI wave equations.

SEISMIC P-WAVE MODELLING IN AN INHOMOGENEOUS TRANSVERSELY ISOTROPIC MEDIUM WITH A TILTED SYMMETRY AXIS

PRIORITY CLAIM

The present application claims priority from PCT/EP2011/057458, filed 10 May 2011, which claims priority from European Application EP 10162694.3, filed 12 May 2010, which are both incorporated herein by reference.

TECHNICAL FIELD OF THE INVENTION

The invention relates to a method for seismic P-wave modelling in an inhomogeneous transversely isotropic medium with a tilted symmetry axis.

BACKGROUND OF THE INVENTION

A medium is called anisotropic if the propagation velocity of seismic waves varies with the direction of propagation.

Transverse Isotropy (TI) is a particular type of anisotropy, as described by L. Thomsen in 1986 in the article "Weak elastic anisotropy" published in the magazine Geophysics, 51, 1954-1966, for which there exists an axis of rotational symmetry, while the propagation velocity is invariant for propagation directions in a plane perpendicular to the axis of symmetry.

More particularly, the invention relates to a method for seismic P-wave modelling to generate a seismic image of a subsurface formation that is represented in a Cartesian coordinate frame as an inhomogeneous transversely isotropic acoustic medium with a tilted symmetry axis of variable direction.

Such a method is known from International patent applications WO2009/092025 and WO2010/014379. These patent publications disclose methods for seismic P-wave modelling in Vertical Transversely Isotropic (VTI) media as well as in Tilted TI media. Both patent publications refer to a method disclosed in 2009 by Fletcher, Du and Fowler in an article titled "Reverse time migration in tilted transversely isotropic (TTI) media" published in the magazine Geophysics, 74, WCA179-WCA187, where a non-zero shear velocity is introduced, while retaining a coupled system of two second-order scalar differential equations. In the seismic literature, such an approach was first presented for VTI media at the EAGE Conference (Rome, 2008) and published by Du, Fletcher and Fowler in extended abstract H033, titled "A new pseudo-acoustic wave equation for VTI media".

The articles published by Du, Fletcher and Fowler deal with a stability problem of different nature than the stability problem solved by the method according to the invention. By introducing a positive shear velocity Vs, Du et al. relieve the physical constraint $\epsilon - \delta \geq 0$ and can deal with a range of negative $\epsilon - \delta$, depending on the choice of Vs. The resulting discretization schemes generally do not satisfy the principles of self-adjointness accomplished by the method according to the invention. Although the approach proposed by Fletcher, Du and Fowler seems to help achieving numerical stability, synthetic experiments for Tilted TI models show that the method proposed by Fletcher, Du and Fowler can fail to yield stable results.

Another approach of modelling acoustic P-waves in a TTI medium, which is closely related to the present invention, was presented at the SEG Conference (Houston, 2009) by Zhang and Zhang and published in expanded abstract SPMI 2.4 titled "A stable TTI reverse time migration and its implementation". Zhang and Zhang apply similar stability concepts (based on self-adjointness) as in the present invention, but Zhang and Zhang's wave equations miss out several cross-coupling terms of relevant stress components. Moreover, their discretization scheme differs from that of the present invention, in which discrete first- and second-order difference operators are combined.

It is an object of the present invention to provide an improved and more accurate method for seismic P-wave modelling to generate a seismic image of a subsurface formation that is represented in a Cartesian coordinate frame as an inhomogeneous transversely isotropic (TI) acoustic medium with a tilted symmetry axis of variable direction.

SUMMARY OF THE INVENTION

In accordance with the invention there is provided a method for seismic P-wave modelling to generate a seismic image of a subsurface formation that is represented in a Cartesian coordinate frame as an inhomogeneous transversely isotropic (TI) acoustic medium with a tilted symmetry axis of variable direction, the method comprising the steps of:

a) measuring seismic P-waves, excited by a seismic source, and propagated through the subsurface formation;

b) generating a pseudo-acoustic stress-strain relationship of a stress tensor and a strain tensor of modelled P-waves by means of a TI elastic tensor, wherein each of the tensors is expressed in a rotated local Cartesian coordinate frame which is aligned with the tilted symmetry axis of the TI medium, in which stress-strain relationship a shear velocity along the axis of symmetry is set to zero, and which stress-strain relationship comprises an axial scalar stress component that is co-axial to the tilted symmetry axis and a lateral scalar stress component in a plane perpendicular to the tilted symmetry axis;

c) combining the pseudo-acoustic stress-strain relationship of step n with an equation of motion to generate a coupled wave equation for the axial and lateral scalar stress components, which equation contains mixed and non-mixed second-order spatial derivatives;

d) discretizing first-order spatial derivatives and non-mixed second-order spatial derivatives by centered finite-differences, with dedicated selection of coefficients;

e) using combinations of the discretized first-order derivatives for the mixed second-order derivatives in the coupled wave equation of step c, and using discretized second-order derivatives for the non-mixed second-order derivatives, while stability of an explicit time-stepping method is established by weighing down the mixed second-order derivatives; and f) forward propagating a simulated shot, and backward propagating measurements of the seismic P-waves through an anisotropic migration model in accordance with steps a-e to generate the seismic image of the subsurface formation.

These and other features, embodiments and advantages of the method according to the invention are described in the accompanying claims, abstract and the following detailed description of non-limiting embodiments depicted in the accompanying drawings, in which description reference numerals are used which refer to corresponding reference numerals that are depicted in the drawings.

BRIEF DESCRIPTION OF THE DRAWINGS

FIG. 1 shows qualitative graphs of (a) $\lambda^{(1)}(\kappa)$, (b) $\{\lambda^{(1)}(\kappa)\}^2$, and (c) $-\lambda^{(2)}(\kappa)$. The coefficients of D and $\Delta$ are designed with the aim of satisfying the inequality $\lambda^{(2)}(\kappa) + \{\lambda^{(1)}(\kappa)\}^2 < 0$.

FIG. 2 shows a two-layer anisotropic velocity model with spatially varying anisotropic symmetry axis. The Thomsen parameters $\epsilon$ and $\delta$ are constant per layer. The symmetry axis direction is varying smoothly per layer and has a strong contrast (more than 45°) at the dipping layer boundary.

FIG. 3 shows wave field snapshots obtained by finite-difference modeling based on equations (2.20) and (2.21) in the anisotropic velocity model of FIG. 2, wherein (a) the snapshot of the $\sigma'_V$ field is made at t=400 ms; no S-wave suppression has been applied and the diamond-shaped S-wave artifact is clearly visible.

(b) the snapshot at t=400 ms is obtained with S-wave suppression by setting $\delta$ equal to $\epsilon$ in a small tapered circular region around the source.

(c) and (d) Snapshots of the $\sigma'_V$ field at t=800 ms are made without and with S-wave suppression at the source and a weak S-wave generated by scattering/reflection from the dipping model contrast is visible in both cases.

FIG. 4 shows an anisotropic velocity model with large contrasts in all medium parameters. This model is used to investigate the stability of different TTI wave equations in complex media.

FIG. 5 shows wave-field snapshots ($\sigma'_V$) at t=0.8 s, computed in the anisotropic velocity model of FIG. 4, using four different TTI wave equations, as described in the following detailed description. The source is located in the isotropic shallow part of the model.

FIG. 6 shows wave-field snapshots ($\sigma'_V$) at t=1.2 s. The TTI wave equation in which spatial derivatives of the rotation matrix are ignored and equation (2.22) starts to generate an instability (top left).

FIG. 7 shows wave-field snapshots ($\sigma'_V$) at t=4 s. The TTI wave equation of Fowler et al. (2009) also generates an instability (top right). The wave equations of Zhang and Zhang (2009a) and equations (2.20)-(2.21) remain stable.

DETAILED DESCRIPTION OF THE DEPICTED EMBODIMENTS

The method according to the present invention provides an approach for P-wave modelling in inhomogeneous transversely isotropic media with tilted symmetry axis (TTI media), suitable for anisotropic reverse-time migration. The proposed approach is based on wave equations, derived from first principles—the equations of motion and Hooke's law—under the acoustic TI approximation. Consequently, no assumptions about the spatial variation of medium parameters are made. A rotation of the stress and strain tensor to a local coordinate system, aligned with the TI-symmetry axis, makes it possible to benefit from the simple and sparse form of the TI-elastic tensor in that system. The resulting wave equations can be formulated either as a set of five first-order partial differential equations or as a set of two second-order partial differential equations.

For the constant-density case, the second-order TTI wave equations involve mixed and non-mixed second-order spatial derivatives with respect to global, non-rotated coordinates. The proposed method encompasses a numerical implementation of these equations using high-order centered finite-differences. Discrete second-order derivative operators are used for the non-mixed second-order derivatives in the wave equations, and repeatedly applied discrete first-order derivative operators are used for the mixed derivatives. This is to minimize modelling artifacts which would occur if repeated centered discrete first-order derivatives were also used for the non-mixed second-order derivatives in the equations. The discretization scheme preserves certain properties related to self-adjointness of the spatial differential operator of the wave equation. It is shown by heuristic arguments and rigid mathematical analysis that such a combination of finite-difference operators leads to a stable wave propagator, provided that the operators are properly designed. In practice, stability is achieved by slightly weighing down terms that contain mixed derivatives. This has a minor, practically negligible, effect on the kinematics of wave propagation. The stability of the presented scheme in inhomogeneous TTI models with rapidly varying anisotropic symmetry axis direction is demonstrated on a number of numerical examples. The results are compared with modelling results obtained with other TTI wave equations proposed in the geophysical literature.

The following detailed description of a preferred embodiment of the method according to the invention comprises the following sections:

1. CITED PRIOR ART REFERENCES and INTRODUCTION
   1.1. Cited prior art references
   1.2. Introduction
2. WAVE EQUATIONS FOR P-WAVES IN TILTED TI MEDIA
   2.1. Vertical symmetry axis—VTI media
   2.2. Tilted symmetry axis—TTI media
   2.3. Implementation aspects
3. DISCRETIZATION AND STABILITY ASPECTS
   3.1. Spatial discretization and design of centered finite difference operators
   3.2. Aspects of stability when exclusively using first-order difference operators
   3.3. Adapting the discretization by using second-order difference operators
4. EXAMPLES AND COMPARISONS
5. MATHEMATICAL TREATMENT OF STABILITY ANALYSIS
   5.1. Eigenvector basis of spatial discretization operator
   5.2. Null-space analysis
   5.3. Using discretized second-order derivative operators
   5.4. Absorbing boundaries by tapering
6. CONCLUSION
7A APPENDIX A. ACOUSTIC TI APPROXIMATION IN HOOKE'S LAW
7B APPENDIX B. PROPERTIES OF DISCRETE DIFFERENCE OPERATOR
   B.1. General anti-symmetric Toeplitz matrix allows a null-space
   B.2. D does not have a null-space if homogeneous boundary conditions are imposed and $\lambda^{(1)}$ is positive in $(0,\pi)$

1. CITED PRIOR ART REFERENCES AND INTRODUCTION

1.1. Cited Prior Art References

In the following description reference will be made to the following prior art references:

Alkhalifah, T. 1998, Acoustic approximations for processing in transversely isotropic media: Geophysics, 63, 623-631;

Alkhalifah, T., 2000, An acoustic wave equation for anisotropic media: Geophysics, 65, 1239-1250;

Bloor, R., Farmer, P., Zhou, H., and Zhang, G., 2006, Sub-salt imaging in VTI media with common-shot reverse-time migration: SEG/EAGE Summer research workshop 2006;

Cerjan, C, Kosloff, D, Kosloff, R., and Reshef. M, 1985, A nonreflecting boundary condition for discrete acoustic and elastic wave equations: Geophysics, 50, 705-708;

Collino, F. and Tsogka, C., 2001, Application of the perfectly matched absorbing layer model to the linear elastodynamic problem in anisotropic heterogeneous media, Geophysics, 66, 294-307;

Corrêa, G. J. P., Spiegelman, M, Carbotte, S., and Mutter, J. C., 2002, Centered and staggered Fourier derivatives and Hilbert transforms: Geophysics, 67, 1558-1563;

Du, X., Bancroft, J. C., and Lines, L. R., 2007, Anisotropic reverse-time migration for tilted TI media: Geophysical Prospecting, 55, 853-869;

Du, X., Fletcher, R., and Fowler, P. J., 2008, A new pseudo-acoustic wave equation for VTI media: 70$^{th}$ EAGE Conference & Exhibition, Expanded Abstracts, H033;

Duveneck, E., Milcik, P., Bakker, P. M., and Perkins, C., 2008, Acoustic VTI wave equations and their application for anisotropic reverse-time migration: 78$^{th}$ Ann. Int. Meeting, SEG, Expanded Abstracts, 2186-2190;

Fletcher, R. P., Du, X., and Fowler, P. J., 2008, A new pseudo-acoustic wave equation for TI media: 78$^{th}$ Ann. Int. Meeting, SEG, Expanded Abstracts, 2082-2086;

Fletcher, R. P., Du, X., and Fowler, P. J., 2009, Reverse time migration in tilted transversely isotropic (TTI) media: Geophysics, 74, WCA179-WCA187;

Fornberg, B., 1987, The pseudospectral method: Comparisons with finite differences for the elastic wave equation, Geophysics, 52, 483-501;

Fowler, P. J., Du, X., Fletcher, R. P., 2010, Coupled equations for reverse-time migration in transversely isotropic media: Geophysics, 75, S11-S22;

Grechka, V., Zhang, L., Rector, J. W., 2004, Shear waves in acoustic anisotropic media, Geophysics, 69, 576-582;

Hestholm, S., 2007, Acoustic VTI modelling using high-order finite differences: 77$^{th}$ Annual Meeting, SEG, Expanded Abstracts 139-143;

Igel, H., Mora, P., and Riollet, B., 1995, Anisotropic wave propagation through finite-difference grids: Geophysics, 60, 1203-1216;

Klie, H. and Toro, W., 2001, A new acoustic wave equation for modelling in anisotropic media: 71$^{st}$ Annual Meeting, SEG, Expanded Abstracts, 1171-1174;

Lesage, A. C., Zhou, H., Araya-Polo, M., Cela, J. M., and Ortigosa, F., 2008, Hybrid Finite-Difference-Pseudospectral Method for 3D RTM in TTI Media: 70$^{th}$ EAGE conference & Exhibition, Extended Abstracts, F042;

Liu, W., Bube, K. P., Zhang, L. B., and Nihei, K., 2009, Stable Reverse-time Migration in Variable-tilt TI media, 71$^{st}$ EAGE conference & Exhibition, Extended Abstracts, P064;

Saenger, E. and Bohlen, T., 2004, Finite-difference modeling of viscoelastic and anisotropic wave propagation using the rotated staggered grid: Geophysics, 69, 583-591;

Thomsen, L., 1986, Weak elastic anisotropy: Geophysics, 51, 1954-1966;

Tsvankin, I., 2001, Seismic signatures and analysis of reflection data in anisotropic media: Elsevier Science;

Zhang, L., Rector III, J. W., and Hoversten, G. M., 2003, An acoustic wave equation for modelling in tilted TI media: 73$^{rd}$ Annual Meeting, SEG, Expanded Abstracts, 153-156;

Zhang, L., Rector III, J. W., and Hoversten, G. M., 2004, Reverse time migration in tilted transversely isotropic media: J. Seis. Explor., 13, 173-188;

Zhang, L., Rector III, J. W., and Hoversten, G. M., 2005, Finite-difference modelling of wave propagation in acoustic tilted TI media: Geoph. Prosp., 53, 843-852;

Zhang, H. and Zhang, Y., 2008, Reverse Time Migration in 3D Heterogeneous TTI Media: 78$^{th}$ Ann. Int. Meeting, SEG, Expanded Abstracts, 2196-2200;

Zhang, Y. and Zhang, H, 2009, A stable TTI reverse-time migration and its implementation: 79$^{th}$ Ann. Int. Meeting, SEG, Expanded Abstracts, 2794-2798;

Zhou, H., Zhang, G., Bloor, R., 2006a, An anisotropic wave equation for VTI media: 68th Conference and Exhibition, EAGE, Extended Abstracts, H033;

Zhou, H, Zhang, G., Bloor, R., 2006b, An anisotropic acoustic wave equation for modeling and migration in 2D TTI media: 76$^{th}$ Ann. Int. Meeting, SEG, Expanded Abstracts, 194-198.

1.2 Introduction

In recent years, the large-scale application of 3D reverse-time migration (RTM) based on full wave-equation modelling has become affordable and has led to significant advances in seismic depth imaging in complex areas, especially for sub-salt imaging.

For reverse-time migration in anisotropic media, the use of wave-field modeling based on the full elastic anisotropic wave equation is inconvenient for a number of reasons: it is computationally very demanding and it requires an anisotropic velocity model that accurately and consistently describes P-wave and S-wave kinematics. This is difficult to obtain in practice. On the other hand, recorded seismic data often contain mainly P-wave reflections (although internal conversions between P- and S-waves are always possible), and usage of P-wave propagators is usually adequate for seismic imaging. Often, the anisotropy of the subsurface can be described with sufficient accuracy by assuming transverse isotropy (TI) with a vertical symmetry axis (VTI medium) or with a tilted symmetry axis (TTI medium). For these reasons, wave-field modeling for anisotropic reverse-time migration is usually performed using efficient modeling schemes that have been specifically designed for describing P-waves in transversely isotropic media.

A common way of deriving simplified wave equations for P-wave modelling in TI media is the "acoustic TI approximation", first introduced by Alkhalifah (1998). It involves describing P-waves in the anisotropic medium in terms of Thomsen parameters $\epsilon$ and $\delta$ and P- and S-wave velocities, $V_P$ and $V_S$, in the direction of the symmetry axis (Thomsen, 1986), and then setting $V_S$ to zero.

Although $V_S$ is set to zero, residual S-waves are excited at the source and by scattering, and a physical stability constraint $\epsilon \geq \delta$ has to be satisfied (e.g., Grechka et al., 2004). Despite these drawbacks, the acoustic TI approximation has proven to be very useful in practice.

In the geophysical literature, the starting point for deriving acoustic VTI wave equations is usually the dispersion relation for VTI media with $V_S = 0$, implying the assumption of locally constant media. Alkhalifah (2000) arrived at a partial differential equation involving fourth-order partial derivatives of the wave field in space and time, including mixed space-time derivatives. Starting from the same dispersion relation, Zhou et al. (2006a), Du et al. (2008), Fowler et al. (2010) and others obtain different variants of systems of two coupled second-order wave equations for modeling in acoustic VTI media. Such second-order wave equations are more convenient for numerical implementation, as they do not involve mixed space-time derivatives. All of these wave equations are kinematically equivalent, i.e. they pointwise share the same dispersion relation. However, having been derived under the assumption of constant medium parameters, their behaviour in inhomogeneous media will differ and the physical meaning of the involved wave fields remains unclear.

Duveneck et al. (2008) present a different approach for obtaining acoustic VTI wave equations without introducing any assumptions or approximations beyond the acoustic TI approximation itself. Starting from first principles (Hooke's law and the equations of motion), they arrive at a set of five first-order partial differential equations in three particle velocity components and two independent stress components or, alternatively, a set of two second-order partial differential equations in the two stress components only.

In many geological situations, a description of the subsurface in terms of a VTI medium is not sufficient to obtain accurate seismic images and a description as a TTI medium is required. Extension of the acoustic VTI wave equations to the case of inhomogeneous TTI media leads to considerable complications. These complications include a considerable increase in numerical cost and the occurrence of mixed second-order spatial derivatives with respect to all three spatial coordinates. A numerical implementation completely in terms of centered first-derivative finite-difference operators can lead to numerical artifacts. The main complication is, however, the stability of TTI wave propagation modelling in inhomogeneous media with strong contrasts in medium parameters, especially if the axis of symmetry varies rapidly.

Finite-difference modeling and RTM in TTI media based on the acoustic TI approximation was first presented by Zhang et al. (2003, 2004, 2005) who directly extend the wave equation of Alkhalifah (2000) by introducing a tilted symmetry axis direction. Zhou et al. (2006b), Lesage et al. (2008), and Fletcher et al. (2008) present TTI extensions to various different systems of coupled second-order VTI wave equations by simply representing the wave-number vector components in the acoustic TI dispersion relation in a rotated coordinate system aligned with the anisotropic symmetry axis. All of these authors only show examples for constant or simple media. Du et al. (2007) present approximate TTI wave equations for P and SV waves based on the acoustic TI approximation combined with a weak-anisotropy approximation, and solve these by pseudo-spectral methods.

Stability problems with TTI wave equations derived from the acoustic TI dispersion relation appear in complex media with strong spatial variation of the symmetry axis direction. The problems can be attributed to the fact that spatial derivatives of medium parameters, in particular of the symmetry axis direction, are ignored or not handled properly when wave equations are derived from a dispersion relation, i.e. under the assumption of constant medium parameters. A number of solutions to the TTI stability problem have been proposed in the literature. Zhang and Zhang (2008) suggest smoothing of the model parameter fields, while Fletcher et al. (2009) and Liu et al. (2009) drop the acoustic TI approximation and derive sets of two second-order wave equations for TTI media with non-zero shear wave velocity. Liu et al. (2009) also propose to apply a rotation to the spatial derivative operators in the first-order acoustic VTI wave equations of Duveneck et al. (2008). While all of these approaches mitigate the problem to some degree, it can be shown that they do not lead to stable solutions in all situations. Zhang and Zhang (2009) recognize that the stability problem is related to properties of the discretised spatial differential operator that is applied to the wave field during time stepping. To obtain stable TTI equations, they suggest to replace the differential operators in the second-order VTI wave equations of Duveneck et al. (2008) by self-adjoint rotated second-derivative operators. Although this approach is somewhat ad-hoc, it addresses the main cause of the instabilities. In this specification of the invented method, wave equations for stable P-wave modeling in inhomogeneous TTI media are presented. These equations are derived from first principles, i.e. from Hooke's law and the equations of motion, without any other assumptions or approximations apart from the acoustic TI approximation.

Although a numerical implementation of the presented equations results in increased computational cost compared to previously published TTI wave equations, they allow stable P-wave modelling in complex TTI media with strong spatial variations in all medium parameters, including the anisotropic symmetry axis.

The method specification is structured as follows: Section 2 contains a derivation of the fundamental acoustic TTI wave equations to be solved. In Section 3, the numerical implementation is discussed, and by heuristical arguments it is shown why stability can be expected. A more rigid presentation of the stability aspects is given in Section 5. Section 4 shows various modeling examples of the method in comparison with the approaches of Fletcher et al. (2009) and Zhang and Zhang (2009a). Additionally, a comparison is presented with an approach where the spatial derivatives of the symmetry axis rotation are completely ignored.

2. WAVE EQUATIONS FOR P-WAVES IN TILTED TI MEDIA

In this section, systems of partial differential equations are derived that describe the propagation of P-waves in transversely isotropic media with vertical and tilted symmetry axis (VTI and TTI media, respectively). For this purpose, the acoustic TI approximation (i.e. setting shear velocity $V_S$ along the axis of symmetry to zero) is used (Alkhalifah, 1998). In contrast to previously published wave equations, the starting point for derivation of the invented method is Hooke's law together with the equations of motion. The resulting wave equations are valid for arbitrarily inhomogeneous transversely isotropic media with sufficient differentiability of the medium parameters. No assumptions or approximations beyond the acoustic TI approximation are used.

Section 2.1 deals with the derivation of sets of first- and second-order acoustic VTI wave equations for variable-density and constant-density media, as first presented by Duveneck et al. (2008). Then Section 2.2 continues with the derivation of acoustic TTI wave equations by introducing a rotation into a local coordinate system aligned with the anisotropic symmetry axis direction, and making use of the simple form of the elastic stiffness tensor in that coordinate system.

Again, the resulting equations can be written as sets of first- or second-order wave equations.

2.1. Vertical Symmetry Axis—VTI Media

As shown in Appendix A, equation (A.6), setting $V_S$ to zero in the elastic tensor for a VTI medium considerably simplifies Hooke's law, which reduces to two independent equations linking stresses and strains:

$$\sigma_H = \rho V_P^2 [(1+2\epsilon)(\epsilon_{11}+\epsilon_{22})+\sqrt{1+2\delta}\epsilon_{33}], \quad (2.1)$$

$$\sigma_V = \rho V_P^2 [\sqrt{1+2\delta}(\epsilon_{11}+\epsilon_{22})+\epsilon_{33}], \quad (2.2)$$

where the horizontal and vertical stress components have been defined as $\sigma_H := \sigma_{11} = \sigma_{22}$ and $\sigma_V := \sigma_{33}$ (see Appendix A). Taking the time derivative of equations (2.1) and (2.2), using a $\partial \epsilon_{ii}/\partial t = \partial v_i/\partial x_i$, and combining the result with the equations of motion, $$\rho \frac{\partial v_i}{\partial t} = \sum_j \frac{\partial \sigma_{ij}}{\partial x_j}, \qquad (2.3)$$

leads to a system of five coupled first-order differential equations in five scalar fields: the three particle velocity components $v_i$ and the two stresses $\sigma_H$ and $\sigma_V$. Identifying x,y,z with the indices 1, 2, 3, these are (Duveneck et al., 2008):

$$\frac{\partial v_x}{\partial t} = \frac{1}{\rho} \frac{\partial \sigma_H}{\partial x}, \qquad (2.4)$$

$$\frac{\partial v_y}{\partial t} = \frac{1}{\rho} \frac{\partial \sigma_H}{\partial y},$$

$$\frac{\partial v_z}{\partial t} = \frac{1}{\rho} \frac{\partial \sigma_V}{\partial z},$$

$$\frac{\partial \sigma_H}{\partial t} = \rho V_P^2 \left[ (1+2\varepsilon)\left(\frac{\partial v_x}{\partial x} + \frac{\partial v_y}{\partial y}\right) + \sqrt{1+2\delta}\, \frac{\partial v_z}{\partial z} \right],$$

$$\frac{\partial \sigma_V}{\partial t} = \rho V_P^2 \left[ \sqrt{1+2\delta}\left(\frac{\partial v_x}{\partial x} + \frac{\partial v_y}{\partial y}\right) + \frac{\partial v_z}{\partial z} \right].$$

Equations (2.4) lend themselves to a finite-difference implementation with a staggered grid scheme (e.g., Virieux, 1986) and allow a straightforward implementation of PML absorbing boundaries (e.g., Collino and Tsogka, 2001).

The particle velocities can be eliminated from this set of first-order differential equations by applying an additional spatial derivative to the first three equations and an additional time derivative to the last two equations and combining the results into a set of two coupled second-order partial differential equations in stresses $\sigma_H$ and $\sigma_V$:

$$\frac{\partial^2 \sigma_H}{\partial t^2} = \rho V_P^2 \qquad (2.5)$$

$$\left\{ (1+2\varepsilon)\left[\frac{\partial}{\partial x}\left(\frac{1}{\rho}\frac{\partial \sigma_H}{\partial x}\right) + \frac{\partial}{\partial y}\left(\frac{1}{\rho}\frac{\partial \sigma_H}{\partial y}\right)\right] + \sqrt{1+2\delta}\, \frac{\partial}{\partial z}\left(\frac{1}{\rho}\frac{\partial \sigma_V}{\partial z}\right) \right\},$$

$$\frac{\partial^2 \sigma_V}{\partial t^2} = \qquad (2.6)$$

$$\rho V_P^2 \left\{ \sqrt{1+2\delta}\left[\frac{\partial}{\partial x}\left(\frac{1}{\rho}\frac{\partial \sigma_H}{\partial x}\right) + \frac{\partial}{\partial y}\left(\frac{1}{\rho}\frac{\partial \sigma_H}{\partial y}\right)\right] + \frac{\partial}{\partial z}\left(\frac{1}{\rho}\frac{\partial \sigma_V}{\partial z}\right) \right\}.$$

For the special case of constant density these equations become (Duveneck et al., 2008):

$$\frac{\partial^2 \sigma_H}{\partial t^2} = V_P^2 \left\{ (1+2\varepsilon)\left[\frac{\partial^2 \sigma_H}{\partial x^2} + \frac{\partial^2 \sigma_H}{\partial y^2}\right] + \sqrt{1+2\delta}\, \frac{\partial^2 \sigma_V}{\partial z^2} \right\}, \qquad (2.7)$$

$$\frac{\partial^2 \sigma_V}{\partial t^2} = V_P^2 \left\{ \sqrt{1+2\delta}\left[\frac{\partial^2 \sigma_H}{\partial x^2} + \frac{\partial^2 \sigma_H}{\partial y^2}\right] + \frac{\partial^2 \sigma_V}{\partial z^2} \right\}. \qquad (2.8)$$

This system of two second-order wave equations has the advantage that in a finite-difference implementation, it requires only three independent spatial finite-difference evaluations per time step (see also Fowler et al., 2010).

2.2. Tilted Symmetry Axis—TTI Media

In the case of transversely isotropic media with a tilted symmetry axis, the elastic tensor loses its simple form. Written in Voigt notation, it contains non-zero entries in all four quadrants, if expressed in global Cartesian coordinates. The consequence is that even if $V_S$ is set to zero, there are six equations relating stresses to strains. This would imply that nine first-order differential equations are needed to describe wave propagation in TTI media with $V_S=0$.

One possibility to reduce the number of required equations in TTI media is to locally rotate the coordinate system so that its third axis coincides with the symmetry axis of the anisotropic medium and make use of the simple form of the elastic tensor in that coordinate system. Let the unit vectors $e_j$ with $j=1, 2, 3$ form an orthonormal basis in the global Cartesian coordinate system with $e_3$ aligned with the vertical direction. If the unit vectors $e'_i$ with $i=1, 2, 3$ form an orthonormal basis in the rotated coordinate system with $e'_3$ pointing in the direction of the symmetry axis of the anisotropic medium, then $$R_{ij} = e'_i \cdot e_j \qquad (2.9)$$

defines the elements of a rotation matrix that transforms vectors from the global (unprimed) to the local (primed) rotated coordinate system. Defining the polar angle $\theta$ and azimuth angle $\phi$ (positive counter-clockwise relative to the x-axis) leads to a rotation matrix of the form $$R = \begin{pmatrix} \cos\theta\cos\varphi & \cos\theta\sin\varphi & -\sin\theta \\ -\sin\varphi & \cos\varphi & 0 \\ \sin\theta\cos\varphi & \sin\theta\sin\varphi & \cos\theta \end{pmatrix}. \qquad (2.10)$$

With this matrix, the elastic tensor $c_{ijkl}$ in the global coordinate system can be written in terms of the elastic tensor $c'_{pqrs}$ in the rotated coordinate system, $c_{ijkl}=R_{pi}R_{qj}R_{rk}R_{sl}c'_{pqrs}$. Hooke's law then becomes $$\sigma_{ij} = R_{pi}R_{qj}R_{rk}R_{sl}c'_{pqrs}\epsilon_{kl}. \qquad (2.11)$$

Here and in the following, repeated indices imply summation over these indices. Defining stress and strain tensor elements in the local, rotated coordinate system, $$\sigma'_{mn} = R_{mi}R_{nj}\sigma_{ij} \text{ and } \epsilon'_{rs} = R_{rk}R_{sl}\epsilon_{kl}, \qquad (2.12)$$

and using the fact that $R_{ij}$ is an orthogonal matrix, $R_{ij}R_{ik}=\delta_{jk}$ and $R_{ji}R_{ki}=\delta_{jk}$, equation (2.11) can be written purely in terms of quantities defined in the rotated coordinate system, $$\sigma'_{mn} = c'_{mnrs}\epsilon'_{rs}. \qquad (2.13)$$

Under the acoustic TI approximation (setting $V_S$ to zero), the elastic tensor in the rotated coordinate system, $c'_{mnrs}$, again has the simple form given in equation (A.6).

Hence, $\sigma'_{mn}$ has non-zero entries only at the diagonal, and equation (2.13) reduces to only two independent equations linking stress and strain components in the rotated coordinate system. Taking the time derivative (denoted by a dot) of these two equations leads to $$\dot{\sigma}'_H = \rho V_P^2 [(1+2\epsilon)(\dot{\epsilon}'_{11}+\dot{\epsilon}'_{22}) + \sqrt{1+2\delta}\,\dot{\epsilon}'_{33}], \qquad (2.14)$$

$$\dot{\sigma}'_V = \rho V_P^2 [\sqrt{1+2\delta}(\dot{\epsilon}'_{11}+\dot{\epsilon}'_{22}) + \dot{\epsilon}'_{33}], \qquad (2.15)$$

where, analogously to equations (2.1) and (2.2), $\sigma'_H$ and $\sigma'_V$ are defined as $\sigma'_H := \sigma'_{11} = \sigma'_{22}$ and $\sigma'_V := \sigma'_{33}$. Using equation (2.12) and the definition of strain rate, $$\dot{\epsilon}'_{kl} = \frac{1}{2}\left(\frac{\partial v_k}{\partial x_l} + \frac{\partial v_l}{\partial x_k}\right),$$

the quantities $\dot{\epsilon}'_{11}$, $\dot{\epsilon}'_{22}$ and $\dot{\epsilon}'_{33}$ can be expressed in terms of particle velocities, $$(\dot{\epsilon}'_{11} + \dot{\epsilon}'_{22}) = (R_{1k}R_{1l} + R_{2k}R_{2l})\frac{\partial v_k}{\partial x_l}, \quad (2.16)$$

$$\dot{\epsilon}'_{33} = R_{3k}R_{3l}\frac{\partial v_k}{\partial x_l}. \quad (2.17)$$

In equations (2.16) and (2.17), the symmetry of the terms involving the rotation matrix elements with respect to interchanging indices k and l has been used.

Knowing that $\sigma'_{mn}$ is a diagonal tensor, the relation (2.12) between stress tensor components in the global and local coordinate system becomes $$\sigma_{ij}=R_{mi}R_{nj}\sigma'_{mn}\%=(R_{1i}R_{1j}+R_{2i}R_{2j})\sigma'_H+R_{3i}R_{3j}\sigma'_V. \quad (2.18)$$

Substitution of this relation in the equations of motion, and using the relations (2.14)-(2.17), one obtains a system of five first-order differential equations, describing wave propagation in acoustic transversely isotropic media with tilted symmetry axis:

$$\frac{\partial v_i}{\partial t} = \frac{1}{\rho}\sum_j \frac{\partial}{\partial x_j}[(R_{1i}R_{1j} + R_{2i}R_{2j})\sigma'_H + R_{3i}R_{3j}\sigma'_V] \quad (2.19)$$

$$\frac{\partial \sigma'_H}{\partial t} =$$

$$\rho V_P^2 \sum_k \sum_l \left[(1+2\epsilon)(R_{1k}R_{1l}+R_{2k}R_{2l}) + \sqrt{1+2\delta}\,R_{3k}R_{3l}\right]\frac{\partial v_k}{\partial x_l}$$

$$\frac{\partial \sigma'_V}{\partial t} = \rho V_P^2 \sum_k \sum_l \left[\sqrt{1+2\delta}\,(R_{1k}R_{1l}+R_{2k}R_{2l}) + R_{3k}R_{3l}\right]\frac{\partial v_k}{\partial x_l}.$$

This system of equations is the TTI counterpart of equations (2.4), which hold for VTI. In deriving these equations, no other approximation besides the acoustic TI approximation has been made. In equations (2.19), the particle velocity components are defined in the global coordinate system, while the quantities $\sigma'_H$ and $\sigma'_V$ are stress tensor components given in the local rotated coordinate system. In contrast to equations (2.4), the finite-difference implementation of equations (2.19) on staggered grids is no longer convenient, as spatial derivatives of the involved wave fields with respect to all spatial coordinates are required.

Like in the VTI case, the particle velocity components $v_i$ can again be eliminated to obtain a system of two second-order wave equations in the stress components $\sigma'_H$ and $\sigma'_V$ only. For the case of constant density, these equations become $$\frac{\partial^2 \sigma'_H}{\partial t^2} = V_P^2\left[(1+2\epsilon)(\dot{\epsilon}'_{11}+\dot{\epsilon}'_{22}) + \sqrt{1+2\delta}\,\dot{\epsilon}'_{33}\right] \quad (2.20)$$

$$\frac{\partial^2 \sigma'_V}{\partial t^2} = V_P^2\left[\sqrt{1+2\delta}\,(\dot{\epsilon}'_{11}+\dot{\epsilon}'_{22}) + \dot{\epsilon}'_{33}\right]$$

with $$(\dot{\epsilon}'_{11}+\dot{\epsilon}'_{22}) = \sum_k \sum_l (R_{1k}R_{1l}+R_{2k}R_{2l}) \quad (2.21)$$

$$\sum_j \frac{\partial^2}{\partial x_l \partial x_j}[(R_{1k}R_{1j}+R_{2k}R_{2j})\sigma'_H + R_{3k}R_{3j}\sigma'_V],$$

$$\dot{\epsilon}'_{33} = \sum_k \sum_l R_{3k}R_{3l}$$

$$\sum_j \frac{\partial^2}{\partial x_l \partial x_j}[(R_{1k}R_{1j}+R_{2k}R_{2j})\sigma'_H + R_{3k}R_{3j}\sigma'_V].$$

If the direction of the symmetry axis is spatially constant, the spatial derivatives of the rotation matrix elements $R_{ij}$ vanish. Because of the orthogonality of the matrix $R_{ij}$, equations (2.20) and (2.21) then simplify to $$\frac{\partial^2 \sigma'_H}{\partial t^2} = V_P^2\Bigg[(1+2\epsilon)\sum_l \sum_j (R_{1i}R_{1j}+R_{2i}R_{2j})\frac{\partial^2 \sigma'_H}{\partial x_i \partial x_j} + \quad (2.22)$$

$$\sqrt{1+2\delta}\sum_l \sum_j R_{3i}R_{3j}\frac{\partial^2 \sigma'_V}{\partial x_i \partial x_j}\Bigg],$$

$$\frac{\partial^2 \sigma'_V}{\partial t^2} = V_P^2\Bigg[\sqrt{1+2\delta}\sum_l \sum_j (R_{1i}R_{1j}+R_{2i}R_{2j})\frac{\partial^2 \sigma'_H}{\partial x_i \partial x_j} +$$

$$\sum_l \sum_j R_{3i}R_{3j}\frac{\partial^2 \sigma'_V}{\partial x_i \partial x_j}\Bigg].$$

Equations (2.22) are much simpler and more convenient to implement than equations (2.20) and (2.21). However, their application in transversely isotropic media with a spatially varying symmetry axis direction leads to instabilities (as illustrated in Section 4) and is therefore not useful in practice.

2.3. Implementation Aspects

In the previous sections, sets of coupled partial differential equations for P-wave modeling in inhomogeneous VTI and TTI media have been derived. The first-order acoustic VTI wave equations (2.4) are easy to discretize into a finite-difference scheme using the staggered-grid approach of Virieux (1986) without the need to interpolate any wave field component to other grid locations. The second-order acoustic VTI wave equations (2.7)-(2.8) for constant density, are also simple do discretize using centered second-order derivative operators, as these equations do not involve mixed second derivatives. In fact only three independent spatial derivative evaluations are required per time step in these wave equations.

The situation becomes significantly more complicated in the acoustic TTI case: a staggered-grid implementation of equations (2.19) is no longer straightforward, as spatial derivatives of all particle velocity components with respect to all spatial coordinates are required, and updating each particle velocity component in turn requires spatial derivatives of stresses with respect to all spatial coordinates. Therefore, in order to apply staggered first-order derivatives, wave field components would need to be interpolated to the grid locations where they are needed (e.g., Igel et al., 1995), or a rotated staggered grid (Saenger and Bohlen, 2004) would need to be used. For a given required modeling accuracy, both possibilities lead to significant extra computational cost and reduced flexibility in defining the finite-difference grid. Also, the rotation matrix elements would need to be available at staggered grid locations.

Eliminating the particle velocity components, equations (2.21), does not overcome these problems, as now mixed second-order spatial derivatives appear.

An alternative is to use centered first-order finite-difference operators, either in equations (2.19) or in equations (2.20) and (2.21). However, centered first-order derivative operators are known to lead to modeling artifacts in the form of high-frequency ringing (e.g., Corrêa et al., 2002). This is due to the improper handling of high wave numbers close to Nyquist by centered first-derivative operators, irrespective of finite-difference operator length (cf. equation (3.3); the problem also appears if pseudo-spectral methods are used). The introduction of these high wave numbers at the source can be reduced, either by putting the source in a local VTI part of the model where equations (2.4) can be used, or by spatially band-limited source injection. High wave numbers will also be introduced by scattering at sharp contrasts in the model, though. Even for lower wave numbers, centered first-order derivative operators are significantly less accurate than staggered first-derivative operators or centered second-order derivative operators of the same length.

In the constant-density case, when equations (2.20)-(2.21) can be used, another possibility arises. Equations (2.21) contain only second-order derivatives, mixed and non-mixed. Therefore centered second-derivative finite-difference operators can be used to calculate non-mixed second-order spatial derivatives, while centered first-derivative operators are used for the mixed derivatives. It turns out that terms involving non-mixed second derivatives dominate over terms with mixed second derivatives, so that ringing artifacts due to the use of centered first-derivative operators are effectively suppressed. A drawback of this approach is the fact that the total number of required spatial finite-difference calculations per time step is increased, as the non-mixed second-order derivatives need to be treated separately. Another complication of the suggested approach of using centered second-derivative operators for the non-mixed second derivatives and centered first-derivatives to calculate the mixed second derivatives is its effect on stability of the resulting modeling scheme. Depending on the properties of the used finite-difference operators, this approach can lead to instabilities. However, in the following sections we shall see that, with an appropriate design of the discrete derivatives, the problem of instability can be overcome. As will be shown in the following, stability is achieved by slightly weighing down terms in the wave equation that involve mixed derivatives. This has a small, but practically negligible effect on the kinematics. In Section 3 this result is derived by heuristic arguments. A more rigid mathematical analysis of stability is presented in Section 5.

3. DISCRETIZATION AND STABILITY ASPECTS

The TTI wave equations (2.20) and (2.21) of Section 2 have been derived from first principles, involving only the acoustic TI approximation. Thus, spatial variations of medium parameters, including that of the TI-symmetry axis, are fully accounted for. Modeling schemes based on these equations will result in physically meaningful wave field amplitudes and should potentially allow stable modeling, also in complex media. This is in contrast to most TTI wave equations described in the geophysical literature. For instance, wave equation obtained by transforming a locally valid dispersion relation from the frequency-wavenumber domain to the time-space domain may be kinematically correct, but frequently the resulting differential equations lack some essential symmetry properties, which may lead to unstable behaviour of the discretized wavefield when propagating through time. As discussed in Section 2.3, a finite-difference modeling scheme based on the constant-density TTI wave equations (2.20) and (2.21) is used in the method of the present invention. The scheme involves computing non-mixed spatial second-order derivatives by discrete second-derivatives, while mixed spatial derivatives are computed by repeatedly applied discrete first-order derivatives. The discrete first- and second-order derivatives are based on high-order centered finite-differences. This approach effectively suppresses high-frequency artifacts that would result if only centered first-derivative finite-difference operators were used. However, combining centered first-order and centered second-order finite-difference operators in the modeling scheme may affect its stability properties, depending on the used finite-difference coefficients. In this section it is investigated what conditions need to be satisfied, apart from the constraint $\epsilon-\delta \geq 0$ due to the acoustic TI approximation, to ensure stability of the proposed modeling scheme.

3.1. Spatial Discretization and Design of Centered Finite Difference Operators As described above, the proposed scheme treats mixed second-order derivatives, like $\partial^2 \partial x \partial y$, by repeated application of centered first-derivative finite-difference operators. For the purpose of a stability analysis, we shall denote these discrete first-derivative operators by $D_j$, $j=1,2,3$, as approximations for $\partial/\partial x$, $\partial/\partial y$, $\partial/\partial z$, respectively. The uni-directional (non-mixed) second-order derivatives, like $\partial^2/\partial x^2$, are discretized by centered second-derivative finite-difference operators, denoted by $\Delta_j$, $j=1,2,3$, for $\partial^2/\partial x^2$, $\partial^2/\partial y^2$, $\partial^2/\partial z^2$, respectively.

The solution space for $\sigma'_H$ and $\sigma'_V$ is that of pairs of scalar functions, defined on a uniformly spaced three-dimensional grid $$\{(x_l, y_m, z_n) = (l\Delta x, m\Delta y, n\Delta z) | l=0, \ldots, N_1; m=0, \ldots, N_2; n=0, \ldots, N_3\}. \tag{3.1}$$

The discrete first-order derivatives $D_j$, acting only in one of the directions along the Cartesian frame, are of type $$(Df)_n = \sum_{k=-K}^{K} \beta_k^{(1)} f_{n-k} \text{ for } n = 0, \ldots, N-1, \tag{3.2}$$

where $f$ is a discrete scalar function, padded by zeros, i.e. $f_n = 0$ for $n=-K, \ldots, -1$ and for $n=N+1, \ldots, N+K$. We assume $\beta_{-k}^{(1)} = \beta_k^{(1)}$ for $k=1, \ldots, K$, with $\beta_0^{(1)}=0$. Thus, each of the $D_j$ can be seen as an anti-symmetric discrete convolution operator for functions $f_{lmn}$ on the three-dimensional grid. The symmetry should be understood in terms of the usual $L_2$ inner product for functions on the grid, e.g. $<D_j f, g> = -<f, D_j g>$ for any two discrete functions $f, g$. Furthermore, the function $\lambda^{(1)}(\kappa)$ is defined by $$\lambda^{(1)}(\kappa) = -\sum_{-K}^{K} \beta_k^{(1)} \sin(k\kappa), \tag{3.3}$$

which is the response $(Df)_0$ of a Fourier component $f_k = \sin(k\kappa)$. The coefficients $\beta_k^{(1)}$ are designed, such that $\lambda^{(1)}(\kappa)$ is a positive function on the interval $(0, \pi)$, which approximates $$\left.\frac{d}{d\xi}\sin(\xi\kappa)\right|_{\xi=0} = \kappa$$

for small values of $\kappa$, as qualitatively depicted in FIG. 1a.

Similarly, the discrete second-order derivatives $\Delta_j$, also acting along one of the directions of the Cartesian coordinate frame, are of type $$(\Delta f)_n = \sum_{k=-K}^{K} \beta_k^{(2)} f_{n-k}, \quad (3.4)$$

with $$\sum_{k=-K}^{K} \beta_k^{(2)} = 0,$$

and $\beta_{-k}^{(2)} = \beta_k^{(2)}$ for $k \geq 1$. Thus, again with padding by zeros, the operators $\Delta_j$ are symmetric convolution operators for discrete functions on the three-dimensional grid, i.e. $<\Delta_j f, g> = <f, \Delta_j g>$. Here, the function $\lambda^{(2)}(\kappa)$ is defined by $$\lambda^{(2)}(\kappa) = \sum_{-K}^{K} \beta_k^{(2)} \cos(k\kappa), \quad (3.5)$$

which is the response $(\Delta f)_0$ of a Fourier component $f_k = \cos(k\kappa)$. The coefficients are designed, such that $-\lambda^{(2)}(\kappa)$ is a positive function on the interval $0,\pi)$, which approximates $$\left.\frac{d^2}{d\xi^2}\sin(\xi\kappa)\right|_{\xi=0} = -\kappa^2$$

for a large range of $\kappa$ in the interval $(0,\pi)$, as qualitatively depicted in FIG. 1c.

The operators $D_j$ and $\Delta_j$ can be understood in the context of Formberg (1987), although the coefficients may be determined in a different way. It will be shown (in Appendix B) that samples of the function $\lambda^{(1)}$ occur as the imaginary part of the spectrum of a discrete derivative operator of type (3.2) with periodic boundary conditions applied. Similarly, samples of $\lambda^{(2)}$ form the spectrum of a discrete second derivative of type (3.4), with periodic boundary conditions applied.

For non-uniform grids, discretized first- and second-order derivatives can be designed in a similar manner, but obviously these operators do not have the (anti-)symmetry properties anymore. In the following discussion of stability aspects, a uniform grid and the induced (anti-)symmetry of $D_j$ and $\Delta_j$ shall be assumed.

3.2. Aspects of Stability when Exclusively Using First-Order Difference Operators With the second-order derivatives $\partial^2/\partial x_i \partial x_j$ in equation (2.21) replaced by their discrete counterparts $D_i D_j$, the operator on the right hand side as a symmetric operator, maps pairs of grid functions $$\begin{pmatrix} \sigma'_H \\ \sigma'_V \end{pmatrix}$$

to pairs of second-order time derivatives of strains $$\begin{pmatrix} \ddot{\varepsilon}'_{11} + \ddot{\varepsilon}'_{22} \\ \ddot{\varepsilon}'_{33} \end{pmatrix}.$$

This symmetric operator will be formally denoted by $$M = \begin{pmatrix} A_k^T A_k & A_k^T B_k \\ B_k^T A_k & B_k^T B_k \end{pmatrix}, \quad (3.6)$$

where summation over $k=1,2,3$ is assumed, and where discrete operators $A_k$ and $B_k$ are defined by $$A_k \sigma = D_j(R_{1k}R_{1j} + R_{2k}R_{2j})\sigma, \quad (3.7)$$

$$B_k \sigma = D_j R_{3k} R_{3j} \sigma, \quad (3.8)$$

$k=1,2,3$, with implicit summation over $j=1,2,3$. Here, $\sigma$ is a discrete function on the grid, which is pointwise multiplied by products of entries of the rotation matrix R as defined by (2.9). Equation (3.6) shows the symmetry of M. It is semi-negative definite as a consequence of the anti-symmetry of the operators $D_j$.

Then, equation (2.20) completes the set of differential equations by pointwise multiplication of $\ddot{\varepsilon}'_{11} + \ddot{\varepsilon}'_{22}$ and $\ddot{\varepsilon}'_{33}$ by the appropriate medium parameters. This operator is formally denoted by $$L = V_P^2 \begin{pmatrix} 1+2\varepsilon & \sqrt{1+2\delta} \\ \sqrt{1+2\delta} & 1 \end{pmatrix}. \quad (3.9)$$

It is a semi-positive definite operator, acting on pairs of scalar grid functions, provided that $\varepsilon - \delta \geq 0$ The operator LM is invariant in time. After discretization of the second-order time derivative by a central difference, one obtains the time-stepping scheme $$\begin{pmatrix} \sigma'_H \\ \sigma'_V \end{pmatrix}_{r+1} - 2\begin{pmatrix} \sigma'_H \\ \sigma'_V \end{pmatrix}_r + \begin{pmatrix} \sigma'_H \\ \sigma'_V \end{pmatrix}_{r-1} = \Delta t^2 LM \begin{pmatrix} \sigma'_H \\ \sigma'_V \end{pmatrix}_r, \quad (3.10)$$

where $\Delta t$ is the time-step, and the sub-script $r$ refers to the wavefield at time $t_r = r\Delta t$.

For the purpose of stability analysis, it suffices to consider the recursion (3.10) with initial conditions $$\begin{pmatrix} \sigma'_H \\ \sigma'_V \end{pmatrix}_{-1} = \begin{pmatrix} 0 \\ 0 \end{pmatrix}$$

and arbitrarily chosen $$\begin{pmatrix} \sigma'_H \\ \sigma'_V \end{pmatrix}_0.$$

The latter may be seen as an initial condition, or alternatively, as a source term which is invoked at time $t_0$.

The spectral properties of the operator LM are crucial for the stability of recursion (3.10). In order to analyse this, note that L can be seen as a symmetric operator, acting on pairs of grid functions. Moreover, it is semi-positive definite due to the physical stability constraint $\epsilon-\delta \geq 0$. At nodes lmn where the anisotropy is elliptic, $\epsilon-\delta=0$, the solution space is point-wise confined to pairs $$\begin{pmatrix} \sigma'_{H\,lmn} \\ \sigma'_{V\,lmn} \end{pmatrix}$$

which are parallel to $$\begin{pmatrix} \sqrt{1+2\delta} \\ 1 \end{pmatrix}.$$

This is effected by a formal orthogonal projection, which can be combined with M (see Section 5.1 for details). With this restriction of the solution space, L is a positive definite operator. Note that also the initial (source) vector $$\begin{pmatrix} \sigma'_H \\ \sigma'_V \end{pmatrix}_0$$

should be chosen consistently with this restriction.

As discussed above, M is a semi-negative definite operator. It can be shown (see Section 5.1) that the product LM of a positive definite and a semi-negative definite operator has a complete set of (generally not orthogonal) eigenvectors with real-valued non-positive eigenvalues. Hence, any initial vector $$\begin{pmatrix} \sigma'_H \\ \sigma'_V \end{pmatrix}_0$$

in the allowed solution space can be decomposed along such a basis of eigenvectors, and each of such components is propagated independently from the others by the recursion (3.10).

Now, consider such a component $a_0 v$ of the initial vector, where v is an eigenvector of LM, with associated eigenvalue $\lambda \leq 0$. This component is propagated as $a_r v$ by recursion (3.10), with $$a_{r+1} - 2a_r + a_{r-1} = \Delta t^2 \lambda a_r, \quad (3.11)$$

where $a_{-1}=0$. If $\lambda \neq 0$, this recursion is solved by $$a_r = \gamma_1 \xi_1^r + \gamma_2 \xi_2^r, \quad \gamma_1/\gamma_2 = -\xi_1/\xi_2, \quad \gamma_1+\gamma_2 = a_0, \quad (3.12)$$

where $$\xi_{1,2} = \frac{1}{2}\left((2+\Delta t^2 \lambda) \pm \sqrt{(2+\Delta t^2 \lambda)^2 - 4}\right). \quad (3.13)$$

Thus, if $\lambda$ is negative, and the time-step $\Delta t$ is sufficiently small (i.e., the Courant-Friedrichs-Lewy condition is satisfied), then the inequalities $-2 < \Delta t^2 \lambda < 0$ are satisfied, which implies that the characteristic roots $\xi_{1,2}$ are mutually different complex conjugates with $|\xi_{1,2}|=1$. Hence, the component along the selected eigenvector remains stable.

If, on the other hand, one selects a component $a_0 v$, which is in the null-space of LM, then $\lambda=0$ and $\xi_1=\xi_2=1$, and the component grows linearly with time, $$a_r = a_0 + a_0 r. \quad (3.14)$$

There are various reasons why the operator M may have a null-space, and we shall analyse this in more detail in Section 5. Here, the different possibilities are discussed.

The first type of a null-space of the operator M is caused by possible null-spaces of the operators $D_j$. Note that the anti-symmetric operator $D_j$ always has a null-space if the number of nodes $N_j$ is an odd number (since $\det(D_j) = \det(D_j^T) = (-1)^{N_j} \det(D_j)$). However, in Appendix B it is shown that an operator D, as defined by (3.2), does not have a null-space if homogeneous boundary conditions are imposed on the grid functions, i.e. $f_0 = f_N = 0$.

A second type of a null-space of M consists of stress fields that are in static equilibrium state. This is a situation where two initial scalar stress potentials $\sigma'_{H0}$ and $\sigma'_{V0}$, satisfying homogeneous boundary conditions, yield a stress field $\sigma_{ij} = R_{im} R_{jn} \sigma'_{mn}$, for which $D_j \sigma_{ij}$ vanishes everywhere in the computational domain. It is not obvious if, and under which conditions, such non-trivial equilibrium states can exist. For an isotropic medium, with $\sigma'_{H0} = \sigma'_{V0}$ this problem does not occur. One can prevent the solution to grow linearly with time by choosing an appropriate initial state (or source term), which is consistent with a valid strain tensor field. We discuss this further in Section 5. Of course, numerical round-off errors and discretization errors may still grow linearly with time if M has a null-space.

3.3. Adapting the Discretization by Using Second-Order Difference Operators

The discrete operator M contains both mixed derivatives $D_j D_k$ with $j \neq k$, and repeated first-order centered differences $D_j D_k$ with $j=k$. As discussed before, usage of the latter is numerically not attractive. The second-order derivatives $\partial^2/\partial x^2/\partial y^2$ and $\partial^2/\partial z^2$ are better approximated by the second-order centered differences $\Delta_1$, $\Delta_2$, and $\Delta_3$, notably for higher $\kappa$-values (cf. (3.3) and (3.5)).

Therefore, it is attractive to replace such twice repeated first-order derivatives in M by their counterparts $\Delta_1$, $\Delta_2$ and $\Delta_3$. This replacement perturbs M to M+E, where E is a symmetric operator, which is essentially a weighted sum of symmetric operators $E_j = \Delta_j - D_j D_j$ (no summation over j) (see Section 5.3). By design of the difference operators $\Delta_j$ and $D_j$ (cf. definitions (3.2)-(3.5)), most of the eigenvalues of $E_j$ can be expected to be negative. The spectral analysis of Appendix B (with periodic boundary conditions applied) suggests that the eigenvalues of $\Delta_j$ and $D_j^2$ approximately follow the profiles $\lambda^{(2)}(\kappa)$ and $-(\lambda^{(1)}(\kappa))^2$ in the interval $(0,\pi)$, respectively. For small $\kappa$, both of these spectral functions are approximations of $-\kappa^2$ (see FIG. 1). For larger $\kappa$, $-\lambda^{(2)}(\kappa)$ tends to dominate $(\lambda^{(1)}(\kappa))^2$ because the latter always has a zero at $\kappa=\pi$. The choice of the coefficients $\beta_k^{(1)}$ and $\beta_k^{(2)}$ leaves some freedom to aim for the inequality $\lambda^{(2)}(\kappa)+(\lambda^{(1)}(\kappa))^2<0$ throughout the interval $(0,\pi)$.

Numerical experience has shown that, with appropriate choice of the coefficients $\beta_k^{(1)}$ and $\beta_k^{(2)}$, $E_j$ is nearly negative definite, indeed. It is forced to be negative definite by weighing down the remaining mixed derivatives $D_jD_k$ with $j\neq k$ by a factor slightly smaller than unity. The amount of downweighing that is required depends on the used finite-difference coefficients and on the actual dimensions and spacings of the grid. Numerical evidence showed that usually a multiplication factor of 0.999 should suffice. Of course, this slightly influences the kinematics of the differential equation. However, the contribution of terms containing the non-mixed derivatives dominates the contribution of the mixed-derivative terms, and the mixed terms cancel out in the dispersion relation for a VTI medium (and hence for an isotropic medium). Thus, weighing down the mixed derivatives by a factor like 0.999 should hardly affect the kinematics of the wave propagation. This is indeed confirmed by numerical tests.

If the perturbation E is negative definite, then the operator M+E is negative definite. Thus, the issues with a possible null-space of the spatial discretization operator are relieved, and the stability considerations of Section 3.2 remain valid.

The stability analysis has been described for uniform grids. A similar principle of weighing down the mixed derivatives is successfully applied for grids with variable spacing, although the (anti-)symmetry of the discretized differential operators does not hold anymore. A theoretical stability analysis for non-uniform grids is beyond the scope of the specification of the method.

In practice, absorbing boundaries can be implemented by introducing a taper at the boundaries of the model (e.g., Cerjan et al. 1985). In Section 5.4, it is shown that such a taper does not invalidate the stability of the discretisation scheme.

4. EXAMPLES AND COMPARISONS

This section contains examples of modeling results obtained in inhomogeneous TTI media with a numerical implementation of equations (2.20) and (2.21), as described in Section 3. The stability of the proposed approach in models with rapidly varying medium parameters is demonstrated and the resulting wave fields are compared to results obtained with selected TTI wave equations found in the geophysical literature. All shown modeling results have been obtained by 2D modeling using high-order centered finite-difference operators.

FIG. 2 shows a two-layer anisotropic velocity model in which the anisotropic symmetry axis direction varies smoothly within each layer, with a large hard contrast (more than 45° difference in symmetry axis direction, no smoothing) at the layer boundary, which is not aligned with the finite-difference grid. Wave field snapshots ($\sigma'_V$) obtained with a 2D version of equations (2.20) and (2.21) for different modeling times are shown in FIG. 3.

FIGS. 3a and 3c display the well-known diamond-shaped, source-generated S-wave (e.g. Grechka et al., 2004), which is typically present in anelliptic TI media (E#45) if the acoustic TI approximation is used. (The weak high-frequency noise, visible near the reflector in FIG. 3c, is caused by an interaction of the $\sigma'_H$-component of the wave field with the reflector. The selected source generates such S-wave related high-frequency noise in the $\sigma'_H$-component, rather than in the $\sigma'_V$-component.) FIGS. 3b and 3d show the same snapshots as in FIGS. 3a and 3c, but with shear-wave suppression applied at the source.

Although more sophisticated methods of handling S-waves during modeling in an acoustic TI medium are available (e.g., Zhang and Zhang 2009b), we apply the pragmatic approach described in Duveneck et al. (2008). It consists of placing a small, smoothly tapered circular region with elliptical anisotropy ($\delta=\epsilon$) around the source. Since no shear waves are generated in elliptically anisotropic media, this will effectively suppress the generation of shear waves at the source, while only minimally influencing kinematics. In fact, the velocity is preserved along the axis of symmetry and for directions perpendicular to it. Even if S-waves are suppressed at the source, they can still be generated by scattering/reflection at model contrasts that are not aligned with the finite-difference grid. In FIG. 3d, such a reflected shear wave is visible as the weak high-frequency wave front traveling at a low velocity behind the P-wave reflection.

FIG. 4 shows a more complex anisotropic velocity model. This model contains a wedge-shaped body and a dipping reflector, and it involves large contrasts in all medium parameters. This model is designed to evaluate and compare different approaches proposed in the geophysical literature to overcome stability problems in P-wave modeling in inhomogeneous TTI media. Results obtained with four different sets of equations are compared: (a) equations (2.22) (which ignore spatial derivatives of the rotation matrix $R_{ij}$), (b) the equations of Fletcher et al. (2009) (which use a non-zero S-wave velocity), (c) one version of the approach suggested by Zhang and Zhang (2009a) (which uses self-adjoint derivative operators), and (d) equations (2.21) and (2.22) presented in this paper, implemented as described in the previous section. In the following, the approaches suggested by Fletcher et al. (2009) and Zhang and Zhang (2009a) will be briefly described.

To address the stability problem of P-wave modeling in TTI media, Fletcher et al. (2009) proposed to drop the acoustic TI approximation, and use a system of two coupled second-order wave equations derived from the elastic TTI dispersion relation with non-zero S-wave velocity $V_S$. The resulting equations are easy and efficient to implement with finite-differences. Although it is unclear why (the authors refer to experimental results), using a non-zero $V_S$ leads to stable modeling in most cases, as long as the S-wave velocity is chosen sufficiently large. With this condition in mind, and to minimize reflections of the propagating S-wave at model contrasts, Fletcher et al. introduce a certain relation between S-wave velocity and P-wave velocity and anisotropy parameters: $\sigma=(\epsilon-\delta)V_P^2/V_S^2$=const. For stability, they suggest a value of $\sigma$ less than 0.8. As they do not involve the acoustic TI approximation, the equations of Fletcher et al. (2009) can be used with $\epsilon<\delta$. However, modeling results will contain propagating S-waves.

Zhang and Zhang (2009a) propose a different approach: starting with the second-order acoustic VTI equations (2.7) and (2.8), they suggest replacing the second-order derivative operators in the global coordinate system by second-order derivative operators in the local rotated coordinate system aligned with the anisotropic symmetry axis. In addition, they require these rotated second-order derivative operators to be self-adjoint by constructing each of them from a rotated first-order derivative operator and its transpose (Zhang and Zhang, 2009a). The resulting equations can be shown to be stable by the same arguments as those presented in Section 3. Depending on the definition of the first-order derivative operators and their transposes, different sets of equations are obtained, which lead to different implementation options and different amplitude behavior of the modeled wave fields. One of the two possibilities discussed by Zhang and Zhang (2009a) leads to rotated derivative operators that involve mixed second-order derivatives. This allows combining centered first- and second-order derivative finite-difference operators in an implementation, as discussed in Section 3.3, significantly reducing high-frequency artifacts in the modeling results. However, in comparison with our equations (2.20)-(2.21), the cross-coupling of their equivalents of our $\sigma'_V$ and $\sigma'_H$ lacks some terms. As a consequence, their amplitude behavior at model contrasts is incorrect and deviates strongly from that of other TTI wave equations. The other possibility suggested by Zhang and Zhang (2009a) leads to equations that require an implementation in terms of first-order derivative finite-difference operators only. If centered first-derivative operators are used, high-frequency artifacts are again generated, but the resulting modeled wave fields show more reasonable amplitude behavior at model contrasts. As can be seen in FIG. 6 for the reflections from the wedge, the obtained amplitudes and phases of reflected and transmitted waves still deviate from those of the other shown TTI modeling results.

FIGS. 5-7 show wave-field snapshots at different modeling times, obtained with the different wave equations in the anisotropic velocity model of FIG. 4. Obviously, using the acoustic TI approximation and ignoring all spatial derivatives of the anisotropic symmetry axis direction (top left in FIGS. 5-7) leads to instabilities where there are rapid variations in the symmetry axis direction. The equations of Fletcher et al. (2009) (top right in FIGS. 5-7) clearly perform much better. In this example, $\sigma$=0.75 was used (note the propagating S-wave visible in the wave-field snapshots). However, at later modeling times, an instability appears. Although in this case, smoothing the model would help, we found examples, where instabilities occurred also in smoothed models. Results obtained with a version of the equations presented by Zhang and Zhang (2009a) are shown at the bottom left of FIGS. 5-7. In this case, an implementation using only centered first-order derivative finite-difference operators was used (the second possibility discussed above). These equations lead to stable modeling results. The wave field contains high-frequency noise due to the use of centered first-order derivative operators. Although it is possible to reduce this noise during modeling, we have made no attempt to do so in this example. The bottom right of FIGS. 5-7 shows results obtained with equations (2.20)-(2.21), implemented using centered first- and second-order derivative operators, as discussed in Section 3.3. Again, these equations lead to stable results. Although high-frequency S-waves are generated by scattering at model contrasts, the wave-field snapshots obtained with equations (2.20)-(2.21) look very clean.

5. MATHEMATICAL TREATMENT OF STABILITY ANALYSIS

This section deals with details of the stability analysis as described in Sections 3.2 and 3.3. First, the solution space is reduced to cope with grid nodes where the medium has elliptic anisotropy, $\epsilon-\delta=0$, and the operator L is modified accordingly. With these measures taken, the discretized spatial differential operator in recursion (3.10) is shown to have a complete basis of eigenvectors in the solution space. Since the eigenvalues are non-positive, this prevents wave field solutions from exponential growth with time. Linearly growing solutions are related to the null-space of the discretized spatial differential operator, as expressed by equation (3.14). In Section 5.2, the null-space is analysed. It is shown that a null-space is partly avoided by applying homogeneous boundary conditions.

In Section 5.3 details are described of replacing the discrete operators $D_j D_k$ for j=k, by discrete second-order derivatives, while stability is enforced by slightly weighing down the remaining mixed derivatives. Finally, in Section 5.4, it is shown that application of absorbing boundaries, by tapering the solution at any time step, does not invalidate the stability of our discretization scheme.

5.1. Eigenvector Basis of Spatial Discretization Operator

In Section 3 it has been shown that the operator L, defined by equation (3.9), pointwise multiplies a pair $$\begin{pmatrix} \sigma'_{H\,lmn} \\ \sigma'_{V\,lmn} \end{pmatrix}$$

by a 2×2-matrix of medium parameters. Furthermore, L is a semi-positive definite operator, provided that $\epsilon-\delta\geq 0$. At nodes with elliptic anisotropy, $\epsilon-\delta=0$, the solution space will be restricted to pairs $$\begin{pmatrix} \sigma'_{H\,lmn} \\ \sigma'_{V\,lmn} \end{pmatrix},$$

which are parallel to $$\begin{pmatrix} \sqrt{1+2\delta} \\ 1 \end{pmatrix}.$$

Thus, the global operator L can be decomposed as $L=\tilde{L}P_{ell}$, where $P_{ell}$ is a (symmetric) orthogonal projection, projecting discrete function pairs $$\begin{pmatrix} \sigma'_H \\ \sigma'_V \end{pmatrix}$$

onto the restricted solution space. With this construction, $\tilde{L}$ is positive definite. At nodes with ellipticity, $\tilde{L}$ reduces to $2V_P^2(1+\delta)$ times the identity matrix.

As discussed in Section 3.2, the operator M, defined by equation (3.6), is semi-negative definite as a consequence of the anti-symmetry of the operators $D_j$. With the restriction of the solution space at nodes with ellipticity, the operator LM is replaced by $LMP_{ell}=\tilde{L}P_{ell}MP_{ell}$. Since $\tilde{L}$ is positive definite, the factorization $LMP_{ell}=\tilde{L}^{1/2}[\tilde{L}^{1/2}P_{ell}MP_{ell}\tilde{L}^{1/2}]\tilde{L}^{-1/2}$ holds. The symmetric operator $\tilde{L}^{1/2}P_{ell}MP_{ell}\tilde{L}^{1/2}$ is semi-negative definite, and has a real-valued eigenvalue decomposition with non-positive eigenvalues. Hence, $LMP_{ell}$ has a complete basis of (non-orthogonal) eigenvectors with non-positive eigenvalues.

5.2. Null-Space Analysis

At least in case of a spatially invariant tilt matrix R, the analytic differential equation (2.20)-(2.21), in the absence of boundary conditions, has a solution which shows linear growth with time. Then, a trivial solution exists with spatially invariant $\sigma'_H$ and $\sigma'_{17}$ and linear growth with time. Such a solution is invalidated by setting homogeneous boundary conditions. This is analysed here for the discretized situation. Appendix B shows that the discrete operators $D_j$ do not have a non-trivial null-space if homogeneous boundary conditions are imposed, provided that the positivity constraint (3.3) is fulfilled.

There is, however, still another reason why M might have a null-space. By inspection of the defining equations (3.6)-(3.8), one finds that $$\sigma = \begin{pmatrix} \sigma'_H \\ \sigma'_V \end{pmatrix}$$

is a null-vector of M, if and only if the functions $u_k$, defined by $u_k = A_k \sigma'_H + B_k \sigma'_V$, vanish for k=1,2,3. This is easily seen by recognizing the equality $<\sigma, M\sigma> = <u_k, u_k>$, where the inner-products $<\ldots,\ldots>$ are the usual $L_2$ inner products for (pairs of) discrete function spaces. In matrix notation, this means $$D_j \left[ R^T \begin{pmatrix} \sigma'_H & 0 & 0 \\ 0 & \sigma'_H & 0 \\ 0 & 0 & \sigma'_V \end{pmatrix} R \right]_{jk} = D_j \sigma_{jk} = 0 \quad (5.1)$$

for k=1,2,3. Here, $\sigma_{jk}$ is the stress tensor in Cartesian coordinates along the (x,y,z)-frame, which is co-linear with the computational grid. Such a stress state is the discrete analogon of an equilibrium state of the medium in absence of externally imposed forces or stresses. It is not obvious if such a stress state can be generated by two scalar stress potentials $\sigma'_H$ and $\sigma'_V$, satisfying homogeneous boundary conditions, in combination with the prescribed rotation field R. If the rotation matrix is the identity matrix everywhere, then one easily observes that such a non-trivial equilibrium state cannot exist, because the operators $D_j$ do not have a non-trivial null-space.

The problem of linear growth with time, as explained in Section 3.2, can be avoided by choosing an appropriate initial or source vector. Instead of choosing arbitrary $$\begin{pmatrix} \sigma'_H \\ \sigma'_V \end{pmatrix}_0,$$

one may select an arbitrary vector field $$u_0 = \begin{pmatrix} u_1 \\ u_2 \\ u_3 \end{pmatrix}_0,$$

and compute $$\begin{pmatrix} \sigma'_H \\ \sigma'_V \end{pmatrix}_0 = L \begin{pmatrix} A_k^T u_k \\ B_k^T u_k \end{pmatrix}.$$

In this way, one obtains an initial value or source term, which is orthogonal to the null-space of M. This procedure is the discrete analogon for choosing a stress source field, consistent with a well-defined strain tensor field, that belongs to a particle displacement field.

5.3. Using Discretized Second-Order Derivative Operators

As discussed in Section 3.3, terms in the operator M, with discrete derivatives $D_j D_k$ for j=k, are modified by using discrete second-order derivatives $\Delta_j$. This replacement perturbs M to M+E, where E is a symmetric operator, defined by $$E = \sum_{j=1}^{3} \begin{pmatrix} \alpha_{kj} E_j \alpha_{kj} & \alpha_{kj} E_j \beta_{kj} \\ \beta_{kj} E_j \alpha_{kj} & \beta_{kj} E_j \beta_{kj} \end{pmatrix}, \quad (5.2)$$

with implicit summation over k=1,2,3, and where $$E_j = \Delta_j - D_j D_j \text{ (no summation over } j\text{)} \quad (5.3)$$

$$\alpha_{kj} = R_{1k} R_{1j} + R_{2k} R_{2j}, \quad (5.4)$$

$$\beta_{kj} = R_{3k} R_{3j}. \quad (5.5)$$

In Appendix B, the spectral properties are analysed for a discrete first-order derivative $\tilde{D}$, under the assumption of periodic boundary conditions. The functions $s_k(n)$ and $c_k(n)$ are eigenfunctions of $\tilde{D}^2$ with eigenvalues $-[\lambda^{(1)}(2\pi k/M)]^2$. Similar expressions as equations (B.3) and (B.4) can be given for a discrete second-order derivative $\tilde{\Delta}$ under the assumption of periodic boundary conditions. Then the functions $s_k(n)$ and $c_k(n)$ are eigenfunctions of $\tilde{\Delta}$ with eigenvalues $\lambda^{(2)}(2\lambda k/M)$.

The design of the coefficients $\beta_k^{(1)}$ and $\beta_k^{(2)}$, as formulated by (3.3) and (3.5), is such that $-\lambda^{(2)}(\kappa)$ and $(\lambda^{(1)}(\kappa))^2$ are both good approximations for $\kappa^2$, at least for small values of $\kappa$. For larger values of $\kappa$ in the interval $(0,\pi)$, $-\lambda^{(2)}(\kappa)$ dominates $(\lambda^{(1)}(\kappa))^2$, because the latter always has a zero at $\kappa=\pi$. The specific choice of the coefficients $\beta_k^{(1)}$ and $\beta_k^{(2)}$ leaves some freedom to aim for the inequality $\lambda^{(2)}(\kappa) + (\lambda^{(1)}(\kappa))^2 < 0$ for $\kappa$ in $(0,\pi)$. At least, the asymptotics at $\kappa=0$ allow for this, and a balance has to be found with the quality of the approximations $\lambda^{(1)}(\kappa) \approx \kappa$ and $-\lambda^{(2)}(\kappa) \approx \kappa^2$, as formulated in Section 3.1.

It can be anticipated that the eigenvalues of $D^2$ and $\Delta$, with homogeneous boundary conditions applied, follow a similar pattern, which implies that the operators $E_j$ in equation (5.3) are nearly negative definite. Indeed, numerical experience has shown that $E_j$ becomes negative definite, if the operators $D_j$ are weighed down somewhat, i.e., $$E_j(w) = \Delta_j - w^2 D_j D_j \quad (5.6)$$

is negative definite with an appropriately selected weight w<1. For the chosen finite-difference coefficients of the presented method of the invention, it was found that w=0.999 suffices. Thus, defining E(w) similar to equation (5.2), with $E_j(w)$ instead of $E_j$, one finds that E(w) is negative definite if each of $E_j(w)$ is negative definite. Indeed, $$\begin{pmatrix} \sigma'_H \\ \sigma'_V \end{pmatrix}^T E(w) \begin{pmatrix} \sigma'_H \\ \sigma'_V \end{pmatrix} = \sum_{j=1}^{3} (\alpha_{kj} \sigma'_H + \beta_{kj} \sigma'_V) E_j(w) (\alpha_{kj} \sigma'_H + \beta_{kj} \sigma'_V), \quad (5.7)$$

(with implicit summation over k=1,2,3). If the $E_j(w)$ are negative definite, this quadratic form can reach zero, only if $\alpha_{kj}\sigma'_H + \beta_{kj}\sigma'_V = 0$ for all indices k,j. Since $\sigma'_H$ and $\sigma'_V$ are independent of these indices k,j, this implies $\sigma'_H = 0$ and $\sigma'_V = 0$.

Consequently, $w^2 M + E(w)$ is negative definite, and one observes that this operator is identical to what is obtained if all mixed derivatives $D_j D_k$, with $j \cdot k$, are replaced by $w^2 D_j D_k$ in the operator M+E. Since the mixed derivatives cancel out in the dispersion relation of the acoustic VTI or isotropic wave equation, the weight factor will have only a minor effect on the kinematics of the perturbed wave equation. Effectively, it slightly influences the anisotropy in the system.

5.4. Absorbing Boundaries by Tapering

In practice, absorbing boundary conditions are easily implemented by applying a taper close to the boundaries of the computational domain (e.g., Cerjan et al. 1985). In this section, it is shown that stability is preserved by applying such a taper, provided that the time step $\Delta t$ is sufficiently small. Let T be a taper operator, i.e., it multiplies the wavefields $\sigma'_H$ and $\sigma'_V$ pointwise at nodes $(x_l, y_m, z_n)$ by a factor, $0 < T_{lmn} \leq 1$. Then, accounting for nodes with elliptic anisotropy, the propagation scheme (3.10) transforms to $$\begin{pmatrix} \sigma_r \\ \sigma_{r+1} \end{pmatrix} = \begin{pmatrix} 0 & T \\ -T & 2T + \Delta t^2 LMP_{ell} T \end{pmatrix} \begin{pmatrix} \sigma_{r-1} \\ \sigma_r \end{pmatrix}, \quad (5.8)$$

with $\sigma_r = \begin{pmatrix} \sigma'_H \\ \sigma'_V \end{pmatrix}_r$.

If T were the identity operator, then the eigensystem of $LMP_{ell}$ maps one-to-one to eigenvectors and eigenvalues of the propagator in equation (5.8): any eigenvector v of $LMP_{ell}$, with eigenvalue $\lambda$, transforms to two eigenvalues $\xi_{1,2}$, as defined by equation (3.13) with corresponding eigenvectors $$\begin{pmatrix} v \\ \xi_{1,2} v \end{pmatrix}.$$

Now, recall that all eigenvalues $\lambda$ of $LMP_{ell}$ are non-positive, and that the eigenvalues $\xi_{1,2}$ are complex-valued of modulus 1, with the exception $\xi_{1,2} = 1$ if $\lambda = 0$. If T deviates from the identity operator, then the propagator in equation (5.8) does not necessarily have a complete basis of eigenvectors. However, it will be shall shown that each eigenvalue $\mu$ of this propagator fulfills either one of the following alternatives:
 a. either $|\mu| < 1$, or
 b. $\mu$ is one of the eigenvalues $\xi_{1,2}$, associated to an eigenvector $$\begin{pmatrix} v \\ \xi_{1,2} v \end{pmatrix},$$

in which case the eigenvector v is not touched by the taper, Tv=v.

Thus, this alternative shows that the propagator in equation (5.12) has a Jordan decomposition, consisting of Jordan blocks with eigenvalue $|\mu| < 1$, possibly completed by eigenvectors with eigenvalues $\xi_{1,2}$, which shows the stability of the propagator.

In order to show the forementioned alternative, let $\mu$ be a (possibly complex-valued) eigenvalue of the propagator, with eigenvector $$\begin{pmatrix} u_1 \\ u_2 \end{pmatrix}.$$

Then, by straightforward substitution in equation (5.8) one obtains $$Tu_2 = \mu u_1; \quad -Tu_1 + (2T + \Delta t^2 LMP_{ell} T) u_2 = \mu u_2, \quad (5.9)$$

which, using $L = \tilde{L} P_{ell}$ as described in Section (5.1), combines to $$-\frac{1}{\mu} T u_2 + (2 + \Delta t^2 T^{-1} \tilde{L}^{1/2} Y \Sigma Y^T \tilde{L}^{-1/2} T) u_2 = \mu T^{-1} u_2, \quad (5.10)$$

where $$Y \Sigma Y^T = \tilde{L}^{1/2} P_{ell} M P_{ell} \tilde{L}^{1/2} \quad (5.11)$$

is an eigenvalue decomposition of a semi-negative definite operator with unitary Y and semi-negative diagonal operator $\Sigma$. Thus, defining $\hat{u}_2 = Y^T \tilde{L}^{-1/2} T u_2$, and pre-multiplying by $T^{-1} \tilde{L}^{1/2} Y$, equation (5.10) transforms to $$-\frac{1}{\mu} T \tilde{L}^{1/2} Y \hat{u}_2 + 2 \tilde{L}^{1/2} Y \hat{u}_2 + \Delta t^2 \tilde{L}^{1/2} Y \Sigma \hat{u}_2 = \mu T^{-1} \tilde{L}^{1/2} Y \hat{u}_2. \quad (5.12)$$

The diagonal operators $\tilde{L}^{1/2}$, T, and $T^{-1}$ commute, so equation (5.12) simplifies to $$-\frac{1}{\mu} TY \hat{u}_2 + 2Y \hat{u}_2 + \Delta t^2 Y \Sigma \hat{u}_2 = \mu T^{-1} Y \hat{u}_2. \quad (5.13)$$

Taking $L_2$ inner products with $Y \hat{u}_2$, and scaling the norm of $\hat{u}_2$ to unity, one obtains $a\mu^2 - b\mu + c = 0$ with $a = \|T^{-1/2} Y \hat{u}_2\|^2$, $b = 2 + \Delta t^2 \langle \Sigma \hat{u}_2, \hat{u}_2 \rangle$, and $c = \|T^{1/2} Y \hat{u}_2\|^2$.

The inequality ac>1 holds, unless a=1 and c=1. In the latter case, the eigenvector is not touched by the taper, which implies that it is an eigenvector of the propagator without application of the taper.

In the first case, the discriminant $b^2 - 4ac$ is negative for small enough $\Delta t$, in which case we have $0 < b \leq 2$. In this situation, $\mu$ is either one of two complex conjugate roots, with $|\mu|^2 = a/c$. Moreover, in this situation either one of a and c exceeds unity. This implies $|\mu| < 1$, which completes the proof of the alternative, formulated for eigenvalues in the Jordan decomposition of the propagator.

6. CONCLUSION

The foregoing detailed description demonstrates that in accordance with the invention there is provided a method for P-wave modeling in inhomogeneous transversely isotropic media with tilted symmetry axis (TTI media), suitable for anisotropic reverse-time migration.

The invented method overcomes the stability problem of P-wave modeling in inhomogeneous TTI media, reported in the geophysical literature, by using wave equations based on the acoustic TI approximation, but derived directly from first principles—Hooke's law and the equations of motion—and therefore making no assumptions on the spatial variation of medium parameters.

A local rotation of the stress tensor makes it possible to benefit from the simple and sparse representation of the TI elastic tensor, expressed in a Cartesian coordinate frame which is aligned with the anisotropic symmetry axis. The resulting wave equations can, like in the acoustic VTI case, be written either as a set of five first-order partial differential equations or as a set of two second-order partial differential equations. Compared to the full elastic anisotropic case, they consequently allow for a significantly more memory-efficient implementation. However, unlike in the acoustic VTI case, the acoustic TTI wave equations require spatial derivatives of all wave-field variables with respect to all spatial coordinates. The involved numerical cost is therefore significantly higher than that of the acoustic VTI equations. An implementation of the constant-density second-order TTI wave equations by finite-differences has been discussed, using high-order centered finite-difference operators. The advantage of these equations for modeling is that they can be written entirely in terms of (mixed and non-mixed) second spatial derivatives. The non-mixed second-order derivatives are discretized by centered second-derivative finite-difference operators, thus minimizing artifacts which occur if the discretization is completely in terms of (repeated) centered first-derivative operators.

The stability of the scheme is at risk when such discrete second-order derivatives are combined with mixed combinations of discrete first-order derivatives. In order to retain stability, the difference between a discrete second-order derivative and the twice applied first-order derivative should be negative definite. Due to the design of the discrete derivatives, one may expect that this is nearly the case. Numerical experience showed that the required negative definiteness is practically achieved by weighing down the discrete first-order derivatives by a factor which is slightly smaller than unity. This has only a minor effect on the anisotropy in the kinematics of the wavefield, because the influence of the affected terms is small and cancels out completely in case of a VTI or isotropic medium. The stability has also been demonstrated on a number of numerical examples involving strongly inhomogeneous TTI media with a rapidly varying axis of symmetry. While the numerical cost of the proposed TTI modeling scheme may be higher than that of some of the schemes described in the geophysical literature, it leads to clean, stable modeling results with physically meaningful amplitude behavior.

7A. APPENDIX A

Acoustic TI Approximation in Hooke'S Law

In this appendix, Hooke's law for anisotropic media with VTI symmetry is presented, first for the full elastic case, then with the acoustic TI approximation of Alkhalifah (1998) applied.

Let $c_{ijkl}$ be the elastic stiffness tensor, and let $a_{ijkl}$ be the density-normalised elastic tensor: $a_{ijkl}=c_{ijkl}/\rho$. We have $c_{ijkl}=c_{jikl}=c_{klij}$. Each of the indices i,j,k,l runs over 1,2,3 for a 3D medium. The general linear triclinic stress-strain relationship (Hooke's law) reads $$\sigma_{ij}=C_{ijkl}\epsilon_{kl},\quad\text{(A.1)}$$

where $\sigma_{ij}$ is the stress tensor and $\epsilon_{kl}$ is the strain tensor, and the summation convention is assumed. In Voigt notation (using the identification $C_{IJ}\leftrightarrow c_{ijkl}$ or $A_{IJ}\leftrightarrow a_{ijkl}$ by mapping of indices $I=\{1,2,3,4,5,6\}\leftrightarrow\{(1,1),(2,2),(3,3),(2,3),(1,3),(1,2)\}$), Hooke's law for transversely isotropic media with vertical symmetry axis (VTI media) can be written as $$\begin{pmatrix}\sigma_{11}\\\sigma_{22}\\\sigma_{33}\\\sigma_{23}\\\sigma_{13}\\\sigma_{12}\end{pmatrix}=\begin{pmatrix}C_{11}&C_{11}-2C_{66}&C_{13}&0&0&0\\C_{11}-2C_{66}&C_{11}&C_{13}&0&0&0\\C_{13}&C_{13}&C_{33}&0&0&0\\0&0&0&C_{44}&0&0\\0&0&0&0&C_{44}&0\\0&0&0&0&0&C_{66}\end{pmatrix}\begin{pmatrix}\epsilon_{11}\\\epsilon_{22}\\\epsilon_{33}\\2\epsilon_{23}\\2\epsilon_{13}\\2\epsilon_{12}\end{pmatrix}.\quad\text{(A.2)}$$

Thus, a VTI medium is characterized by five independent parameters, $C_{11},C_{33},C_{13},C_{44},C_{66}$. Alternatively, VTI media can be described in terms of the vertical P- and S-velocities, $V_P$ and $V_S$, and the Thomsen parameters $\epsilon,\delta,\gamma$ (Thomsen, 1986). These are related to the elements of the elastic tensor by:

$$V_P^2=A_{33},\quad\text{(A.3)}$$

$$V_S^2=A_{44},$$

$$\delta=\frac{(A_{13}+A_{44})^2-(A_{33}-A_{44})^2}{2A_{33}(A_{33}-A_{44})},$$

$$\epsilon=\frac{A_{11}-A_{33}}{2A_{33}},$$

$$\gamma=\frac{A_{66}-A_{44}}{2A_{44}},$$

Thus, reversely, the following equalities hold:

$A_{11}=V_P^2(1+2\epsilon),$ $A_{33}=V_P^2,$ $A_{44}=V_S^2,$ $A_{66}=V_S^2(1+2\gamma),$ $(A_{13}+A_{44})^2=(V_P^2-V_S^2)^2+2\delta V_P^2(V_P^2-V_S^2).\quad\text{(A.4)}$ The analysis is confined to the case $A_{13}+A_{44}>0$ (this branch contains the isotropic case), although the negative case is strictly not forbidden. The matrix $(C_{IJ})$ is positive definite if and only if the following constraints are satisfied (e.g. Tsvankin, 2001):

$C_{33}>0,\ C_{44}>0,\ C_{66}>0\text{ and }(C_{11}-C_{66})C_{33}>C_{13}^2.\quad\text{(A.5)}$ Next, the acoustic TI approximation will be applied, i.e. setting $V_S=0$, in the elastic tensor. Consequences of this approximation are discussed in Alkhalifah (1998, 2000) and in Grechka et al. (2004). Applying the acoustic TI approximation considerably simplifies the elastic tensor for VTI media. Straightforward substitution of the relations (A.4) and (A.3) into equation (A.2), after setting $V_S=0$, gives $$\begin{pmatrix}\sigma_{11}\\\sigma_{22}\\\sigma_{33}\\\sigma_{23}\\\sigma_{13}\\\sigma_{12}\end{pmatrix}=\rho V_P^2\begin{pmatrix}1+2\epsilon&1+2\epsilon&\sqrt{1+2\delta}&0&0&0\\1+2\epsilon&1+2\epsilon&\sqrt{1+2\delta}&0&0&0\\\sqrt{1+2\delta}&\sqrt{1+2\delta}&1&0&0&0\\0&0&0&0&0&0\\0&0&0&0&0&0\\0&0&0&0&0&0\end{pmatrix}\begin{pmatrix}\epsilon_{11}\\\epsilon_{22}\\\epsilon_{33}\\2\epsilon_{23}\\2\epsilon_{13}\\2\epsilon_{12}\end{pmatrix}\quad\text{(A.6)}$$

This implies that the horizontal stresses $\sigma_{11}$ and $\sigma_{22}$ are equal for any strain tensor, while the off-diagonal components of the stress tensor are identically zero. Thus, only two independent equations (2.1) and (2.2) remain.

The explicit formulation (A.6) of the stiffness tensor shows that the stability constraint $(C_{11}-C_{66})C_{33} > C_{13}^2$ is now equivalent to $(\epsilon - \delta) > 0$.

7B. APPENDIX B

Properties of Discrete Difference Operator

7.B.1. General Anti-Symmetric Toeplitz Matrix Allows a Null-Space

In a matrix formulation, the anti-symmetric operator D, as defined by (3.2), has the shape of a 2K+1-diagonal band N×N-dimensional Toeplitz matrix of type $$D = \begin{pmatrix} 0 & \beta_{-1} & \ldots & \beta_{-K} & 0 & \ldots & \ldots & \ldots & 0 \\ \beta_1 & 0 & \beta_{-1} & \ldots & \beta_{-K} & \ldots & & & \vdots \\ \vdots & \ldots & \ldots & \ldots & \ldots & \ldots & & & \\ \beta_K & \ldots & \beta_1 & 0 & \beta_{-1} & \ldots & \beta_{-K} & \ldots & \vdots \\ 0 & \ldots & & \ldots & \ldots & \ldots & & \ldots & 0 \\ \vdots & \ldots & \beta_K & \ldots & \beta_1 & 0 & \beta_{-1} & \ldots & \beta_{-K} \\ & & & \ldots & & \ldots & \ldots & \ldots & \vdots \\ \vdots & & & \ldots & \beta_K & \ldots & \beta_1 & 0 & \beta_{-1} \\ 0 & \ldots & \ldots & \ldots & 0 & \beta_K & \ldots & \beta_1 & 0 \end{pmatrix} \quad (B.1)$$

First, note that the anti-symmetric operator D always has a null-space if N is an odd number. This is a consequence of the equality $\det(D) = \det(D^T) = (-1)^N \det(D)$. One might hope that a null-space is not present for functions with homogeneous boundary conditions, i.e., $f_n = 0$ for $n = 0, N$. However, this is not generally true. The following counter example shows this.

Counter Example

For K=2 and N odd, the operator D can have a null-space satisfying homogeneous boundary conditions, if the requirement of positive $\lambda^{(1)}(\kappa)$ is relaxed (cf. definition (3.3)).

For convenience, we padd D by K columns on the left, as well as on the right, such that the band structure continues. This does not have any effect to $Df$, provided that $f$ has extended homogeneous boundary conditions, $f_{-K} = f_{-K+1} = \ldots = f_{-1} = f_0 = 0$ and $f_{N-1} = f_N = \ldots = f_{N+K-1} = 0$ If $f = (f_{-K}, f_{-K+1}, \ldots, f_{-1}, f_0, f_1, \ldots, f_{N-1}, f_N, \ldots, f_{N+K-1})^T$, satisfying such extended homogenous boundary conditions, were in the null-space of D, then its entries satisfy a homogenous recursion $$\sum_{k=-K}^{K} \beta_k f_{n-k} = 0.$$

Assuming that the roots $\mu_j$ of the characteristic equation $$\sum_{1}^{K} \beta_k (\mu^k - \mu^{-k}) = 0$$

are all different, the discrete function $f$ is a linear combination of the functions $(\mu_j^{-K}, \mu_j^{-K+1}, \ldots, \mu_j^{-1}, 1, \mu_j, \ldots, \mu_j^{N-1}, \mu_j^N, \ldots, \mu_j^{N+k-1})^T$, while it satisfies the extended homogeneous boundary conditions.

The roots $\mu_j$ and $1/\mu_j$ always occur in pairs, and the values $\mu_j = \pm 1$ are always roots of this characteristic equation.

As an example, we take the case K=2, which results in the characteristic equation $\mu^{-2}(\mu^2-1)(\beta_2\mu^2+\beta_1\mu+\beta_2)=0$ with roots $\mu_{1,2}=\pm 1$ and $\mu_{3,4}=\{-\beta_1/\beta_2 \pm \sqrt{(\beta_1/\beta_2)^2-4}\}/2$ that can be written as $\mu_{3,4}=\exp(\pm i\kappa)$ for real $\kappa$ in $(0,2\pi)$, if $-2<\beta_1/\beta_2<2$. This implies that a particular selection of the ratio $\beta_1/\beta_2$ is allowed, such that $\kappa=2\pi/(N+K-1)$, and $\mu_{3,4}^{N+K-1}=1$. Furthermore, if N+K-1 is even, then $\mu_{1,2}^{N+K-1}=(\pm 1)^{N+K-1}=1$.

Hence, a counter example is constructed for which the linear equations, obtained to satisfy the two groups of homogeneous boundary conditions for $(f_{-K}, f_{-K+1}, \ldots, f_{-1}, f_0)^T$ and $(f_{N-1}, f_N, \ldots, f_{N+K-1})^T$, are linearly dependent. In this particular case, with K=2, one has three independent equations for four coefficients. Thus, D has a non-trivial null-space satisfying the homogeneous boundary conditions.

With the substitution $\mu = \exp(i\kappa)$, the characteristic function $$\sum_{1}^{K} \beta_k (\mu^k - \mu^{-k})$$

transforms to $$2i \sum_{1}^{K} \beta_k \sin(k\kappa).$$

Hence, the function $\lambda^{(1)}(\kappa)$ has zeros $\exp(\pm i\kappa)$ for K in the interval $(0,\pi)$, and one may argue that the constructed counter example does not satisfy the design criteria, as formulated in Section 3.1. On the other hand, the counter example shows that the required absence of zeros of $\lambda^{(1)}(\kappa)$ in the interval $(0,\pi)$ is essential to avoid a null-space of D.

7.B.2. D does not have a Null-Space if Homogeneous Boundary Conditions are Imposed and $\lambda(1)$ is Positive in $(0,\pi)$ It is instructive to investigate the difference operator with periodic boundary conditions applied. Then the operator D is adapted to its cyclic extension $\tilde{D}$, defined in matrix form by $$\tilde{D} = \begin{pmatrix} 0 & \beta_{-1} & \ldots & \beta_{-K} & 0 & \ldots & \beta_K & \ldots & \beta_1 \\ \beta_1 & 0 & \beta_{-1} & \ldots & \beta_{-K} & & & \ldots & \vdots \\ \vdots & \ldots & \ldots & \ldots & & \ldots & & & \beta_K \\ \beta_K & \ldots & \beta_1 & 0 & \beta_{-1} & \ldots & \beta_{-K} & & \vdots \\ 0 & \ldots & & \ldots & \ldots & \ldots & & \ldots & 0 \\ \vdots & & \beta_K & \ldots & \beta_1 & 0 & \beta_{-1} & \ldots & \beta_{-K} \\ \beta_{-K} & & & \ldots & & & \ldots & \ldots & \vdots \\ \vdots & \ldots & & & \beta_K & \ldots & \beta_1 & 0 & \beta_{-1} \\ \beta_{-1} & \ldots & \beta_{-K} & \ldots & 0 & \beta_K & \ldots & \beta_1 & 0 \end{pmatrix} \quad (B.2)$$

The operator $\tilde{D}$ is considered to be an M×M-matrix, with M=N+2K. The coefficients are $\beta_k = \beta_k^{(1)}$ as in definition (3.3), where the coefficients are designed, such that $\lambda^{(1)}(\kappa)$ is positive in the interval $(0,\pi)$.

Now, apply $\tilde{D}$ to discrete functions, which are periodic extensions of $(f_0, f_0, \ldots, f_{M-1})$ with period M. The functions $$s_k(n) = \sin\left(2\pi \frac{kn}{M}\right), \text{ for } 0 < k < M/2,$$

with the functions $$c_k(n) = \cos\left(2\pi \frac{kn}{M}\right), \text{ for } 0 \le k \le M/2,$$

form a complete orthogonal basis for the function space. By straightforward manipulations, one derives $$(\tilde{D}f)_n = \sum_{k=1}^{[(M-1)/2]} \lambda_k b_k c_k(n) - \sum_{k=1}^{[(M-1)/2]} \lambda_k a_k s_k(n) \quad (B.3)$$

with $$\lambda_k = \lambda^{(1)}(2\pi k/M) \quad (B.4)$$

for any $$f_n = \sum_{k=0}^{[M/2]} a_k c_k(n) + \sum_{k=1}^{[(M-1)/2]} b_k s_k(n) \quad (B.5)$$

(the notation [x] means the largest integer n with n≤x). Thus, $\tilde{D}$ has either a one- or two-dimensional null-space: the constant function $c_0(n)=1$ is always mapped to zero, while for even M also the function $c_{M/2}(n)=(-1)^n$ is mapped to zero.

A trivial way to suppress the null-space would be band-limitation, i.e. assuming $a_0=0$, and also $a_{M/2}=0$ for even M. However, it will be shown that the null-space is also suppressed by requiring homogeneous boundary conditions:

$f_0 = 0$ and $f_{M-1} = 0$.

Indeed, if $(\tilde{D}f)_n=0$ for n=0, ..., M−1, for any function $f$, satisfying these homogeneous boundary conditions, then all (Fourier) expansion coefficients of $\tilde{D}f$ vanish. Hence, $f$ can have non-zero coefficients only for indices with $\lambda_k=0$, i.e. $a_0$ and $a_{M/2}$ if M is even. In terms of the homogenous boundary conditions, one has $f_0=0$ for M odd, and $f_0=a_0+a_{M/2}=0$ for M even. In the latter case, the other boundary condition, $f_{M-1}=a_0+a_{M/2}c_{M/2}(M-1)=0$, is also used. This forms a linearly independent system of equations for $a_0$ and $a_{M/2}$, because $c_{M/2}(M-1)\ne 1$.

Consequently, the remaining coefficients $a_0$ and $a_{M/2}$ vanish also in this case, which implies that $\tilde{D}$ does not have a non-trivial null-space if homogeneous boundary conditions are required.

Now, the homogeneous boundary conditions are extended with K additional zeros on both ends, i.e. $f_n=0$ for n=0, ..., K and for n=M−K−1, ..., M−1. This situation corresponds to the homogeneous boundary conditions which are imposed in the non-periodic case for the operator D. It will be shown that these boundary conditions exclude a null-vector of D.

Suppose that D has a null-vector $f$, i.e. $(Df)_n=0$ for n=K, ..., M−K−1, (or alternatively, using M=N+2K and after applying a backward shift of n over K positions, for n=0, ..., N−1), while it also satisfies the extended homogeneous boundary conditions. Note that $(\tilde{D}f)_n=(Df)_n$ with n=K, ..., M−K−1, for such $f$.

Let P be the orthogonal projection which restricts functions to the nodes n=0, ..., K and n=M−K, ..., M−1. Then we have $Pf=0$ and $(I−P)\tilde{D}f=0$, and hence $$(I-P)\tilde{D}(I-P)f=0, \text{ while } f=(I-P)f\ne 0. \quad (B.6)$$

By including the periodically repeated node n=M, one observes that the nodes n=0, ..., K and n=M−K, ..., M are symmetric with respect to the point x=M/2, which may or may not be a node in the grid, depending on the parity of M. Thus, for any function g, that is symmetric or anti-symmetric with respect to this point, its projection Pg also has this symmetry property. In particular, one observes that the basis functions $c_k$ and $s_k$ are symmetric and anti-symmetric with respect to x=M/2, respectively.

The expressions (B.3)-(B.5) show that $\tilde{D}$ has a decomposition of type $V\kappa V^T$, where V is the orthogonal matrix with the normalised basis functions $c_k$ and $s_k$ in its columns. Let V be ordered in such a way that $V=(V_c \; V_s)$, where $V_c$ contains the $c_k$, and $V_s$ contains the $S_k$. Then $\kappa$ has the form of a block matrix $$\Lambda = \begin{pmatrix} 0 & \Lambda_s \\ -\Lambda_c & 0 \end{pmatrix},$$

where $$\Lambda_c = \begin{pmatrix} 0 & \cdots & \cdots & \cdots & \cdots & 0 \\ \cdots & \lambda_1 & & & & \cdots \\ \cdots & & \cdots & & & \cdots \\ \cdots & & & \lambda_k & & \cdots \\ \cdots & & & & \cdots & 0 \\ 0 & \cdots & \cdots & \cdots & 0 & \lambda_{[M/2]} \end{pmatrix} \text{ and} \quad (B.7)$$

$$\Lambda_s = \begin{pmatrix} \lambda_1 & \cdots & \cdots & \cdots & \cdots & 0 \\ \cdots & \lambda_2 & & & & \cdots \\ \cdots & & \cdots & & & \cdots \\ \cdots & & & \lambda_k & & \cdots \\ \cdots & & & & \cdots & 0 \\ 0 & \cdots & \cdots & \cdots & 0 & \lambda_{[(M-1)/2]} \end{pmatrix}$$

with all $\lambda_k$ positive, except $\lambda_{[M/2]}=0$ if M even.

Let $\xi_c=V_c^T f$ and $\xi_s=V_s^T f$ be the associated coefficient vectors of the assumed null-vector f, which is identified with the function $f$.

Since the projection operator P preserves symmetry and anti-symmetry of functions with respect to the central position x=M/2, the operator $V_s^T(I-P)V_c$ and its transposed $V_c^T(I-P)V_s$ vanish. Thus, using $f=(I-P)f$ (see (B.6)), one finds $$\xi_c = V_c^T(I-P)V_c \xi_c \text{ and } \xi_s = V_s^T(I-P)V_s \xi_s. \quad (B.8)$$

Let g be defined by $$g = (V_c \; V_s)\begin{pmatrix} -\xi_s \\ \xi_c \end{pmatrix}.$$

Then one finds $$V^T(I-P)g = (V_c \;\; V_s)^T(I-P)(V_c \;\; V_s)\begin{pmatrix}-\xi_s\\ \xi_c\end{pmatrix} = \begin{pmatrix}-\xi_s\\ \xi_c\end{pmatrix}, \quad (B.9)$$

and consequently equation (B.6) leads to $$0 = g^T(I-P)\tilde{D}(I-P)f = \begin{pmatrix}-\xi_s\\ \xi_c\end{pmatrix}^T \Lambda \begin{pmatrix}\xi_s\\ \xi_c\end{pmatrix} = -\xi_s^T \Lambda_s \xi_s - \xi_c^T \Lambda_c \xi_c. \quad (B.10)$$

Due to the positivity of the $\lambda_k$, this implies that only $\xi_{c,0}$ and, if M even, $\xi_{c[M/1/2]}$ might be non-zero. However, it has been shown before that a linear combination of $c_0$ and $c_{M/2}$ cannot satisfy the homogeneous boundary conditions.

So, finally one concludes that the operator D does not have a non-trivial null-space in the subspace of functions $f$, satisfying homogeneous boundary conditions, i.e. $f_0 = 0$ and $f_{M-1} = 0$, provided that the positivity constraint (3.3) for $\lambda^{(1)}$ is fulfilled.

What is claimed is:

1. A method for seismic P-wave modelling to generate a seismic image of a subsurface formation that is represented in a Cartesian coordinate frame as an inhomogeneous transversely isotropic (TI) acoustic medium with a tilted symmetry axis of variable non-vertical direction, the method comprising the steps of:
   a) measuring seismic P-waves, excited by a seismic source, and propagated through the subsurface formation;
   b) generating a pseudo-acoustic stress-strain relationship of a stress tensor and a strain tensor of modelled P-waves, in the Cartesian coordinate frame by means of a TI elastic tensor, wherein each of the tensors is expressed in a rotated local Cartesian coordinate frame which rotated local Cartesian coordinate frame is rotated relative to the Cartesian coordinate frame in which the subsurface formation is imaged and aligned with said tilted symmetry axis of the variable non-vertical direction of the TI medium, in which stress-strain relationship a shear velocity along the axis of symmetry is set to zero, and which stress-strain relationship comprises an axial scalar stress component that is co-axial to the tilted symmetry axis and a lateral scalar stress component in a plane perpendicular to the tilted symmetry axis;
   c) combining the pseudo-acoustic stress-strain relationship of step b with an equation of motion to generate a coupled wave equation for the axial and lateral scalar stress components, which equation contains mixed and non-mixed second-order spatial derivatives;
   d) discretizing first-order spatial derivatives and non-mixed second-order spatial derivatives by centered finite-differences, with dedicated selection of coefficients;
   e) using bi-directional combinations of the discretized first-order derivatives for the mixed second-order derivatives in the coupled wave equation of step c, and using discretized second-order derivatives for the non-mixed second-order derivatives, while stability of an explicit time-stepping method is established by weighing down the mixed second-order derivatives; and
   f) forward propagating a simulated shot, and backward propagating seismic P-waves measured in step a), through an anisotropic migration model in accordance with steps a-e to generate the seismic image of the subsurface formation.

2. The method of claim 1, wherein the elastic TI tensor, the stress tensor, and the strain tensor are expressed in a rotated local Cartesian coordinate system, which is aligned with the variable direction of the axis of symmetry in the TI acoustic medium, and where a pseudo-acoustic approximation is applied by setting the shear velocity along the axis of symmetry to zero, $V_S = 0$, thereby generating two scalar wave fields, comprising the axial scalar stress component $\sigma'_V$ for the axial stress component and the lateral scalar stress component $\sigma'_H$ for the stress component in the plane perpendicular to the axis of symmetry, and the pseudo-acoustic stress-strain relationship is expressed by the formulas:

$$\sigma'_H = \rho V_P^2 \{(1+2\epsilon)(\epsilon'_{11}+\epsilon'_{22}) + \sqrt{1+2\delta}\,\epsilon'_{33}\},$$

$$\sigma'_V = \rho V_P^2 \{\sqrt{1+2\delta}\,(\epsilon'_{11}+\epsilon'_{22}) + \epsilon'_{33}\},$$

where $\rho$ is a medium density, $V_P$ is a P-velocity along the axis of symmetry, $\delta$ and $\epsilon$ are anisotropy parameters, known as Thomsen parameters, and where $\epsilon'_{33}$ is an axial component of strain along the axis of symmetry, and $\epsilon'_{11}$ and $\epsilon'_{22}$ are lateral strain components in the plane perpendicular to the tilted symmetry axis.

3. The method of claim 2, wherein the pseudo-acoustic approximation implies a physical stability constraint $\epsilon - \delta \geq 0$, and the coupled wave equation for the two scalar stress components $\sigma'_V$ and $\sigma'_H$ is derived from first principles, which principles comprise the equation of motion and the pseudo-acoustic stress-strain relationship, thereby taking into account spatial variation of medium parameters, including the variable direction of the symmetry axis of the TI medium, and the coupled wave equation is expressed by the formulas:

$$\frac{\partial^2 \sigma'_H}{\partial t^2} = V_P^2 \big[(1+2\epsilon)(\ddot{\epsilon}'_{11}+\ddot{\epsilon}'_{22}) + \sqrt{1+2\delta}\,\ddot{\epsilon}'_{33}\big]$$

$$\frac{\partial^2 \sigma'_V}{\partial t^2} = V_P^2 \big[\sqrt{1+2\delta}\,(\ddot{\epsilon}'_{11}+\ddot{\epsilon}'_{22}) + \ddot{\epsilon}'_{33}\big],$$

where t is a time-variable, and $\ddot{\epsilon}'_{11}$, $\ddot{\epsilon}'_{22}$, $\ddot{\epsilon}'_{33}$ are second-order time-derivatives of $\epsilon'_{11}$, $\epsilon'_{22}$, $\epsilon'_{33}$, which are expressed by $$(\ddot{\epsilon}'_{11}+\ddot{\epsilon}'_{22}) = \sum_k \sum_l (R_{1k}R_{1l} + R_{2k}R_{2l})$$

$$\sum_j \frac{\partial^2}{\partial x_l \partial x_j}[(R_{1k}R_{1j} + R_{2k}R_{2j})\sigma'_H + R_{3k}R_{3j}\sigma'_V],$$

$$\ddot{\epsilon}'_{33} = \sum_k \sum_l R_{3k}R_{3l} \sum_j \frac{\partial^2}{\partial x_l \partial x_j}[(R_{1k}R_{1j} + R_{2k}R_{2j})\sigma'_H + R_{3k}R_{3j}\sigma'_V],$$

wherein the latter two equations specify a spatial differential operator consisting of both mixed second-order derivatives and non-mixed second-order derivatives, in which $x_l$ and $x_j$ are spatial Cartesian coordinates and $R_{ij}$ are entries of a rotation matrix that transforms vectors from the global to the local rotated coordinate system.

4. The method of claim 3, further comprising designing:
a discrete first-order derivative operator D and
a discrete second-order derivative operator $\Delta$, which are designed as high-order centered finite-difference operators, with tuned coefficients, according to principles of spectral approximation, in which operator coefficients are chosen with the aim of obtaining good approximations for derivatives of Fourier components, while $\Delta-D^2$ is aimed to be negative definite.

5. The method of claim 4 wherein the second-order temporal derivatives $$\frac{\partial^2 \sigma'_H}{\partial t^2} \text{ and } \frac{\partial^2 \sigma'_V}{\partial t^2}$$

are treated by a second-order divided difference, leading to a three-term time-stepping scheme for numerical evolution of the wave fields after discretization of the spatial differential operator.

6. The method of claim 1 wherein a stability analysis is used to show that the evolution of $\sigma'_V$ and $\sigma'_H$ is stable for a spatial discretization of the coupled wave equation expressed by the formulas according to claim 3, in which all second-order derivatives (both mixed and non-mixed) are approximated by combinations $D_i D_j$, where $D_i$ and $D_j$ are discrete first-order derivative operators for the $x_i$- and $x_j$-coordinates, designed according to the method of claim 4, provided that:
  a. $\epsilon - \delta \geq 0$ throughout the medium,
  b. homogeneous boundary conditions are applied,
  c. an appropriate ratio of the two scalar stress components is honoured in areas of ellipticity (nodes with $\epsilon = \delta$), and
  d. a source term and/or initial condition is consistent with a valid strain tensor.

7. The method of claim 6 wherein to prevent numerical artifacts, which would be generated for the spatial discretization according to claim 6, in particular for high spatial frequency components of the wave field, discrete second-order derivative operators $\Delta_j$, designed in accordance with claim 4, are used for the non-mixed second-order derivatives with respect to the $x_j$-coordinates, whereupon, to avoid losing stability, each of the differences $\Delta_j - D_j^2$ is a negative definite operator.

8. The method of claim 7, wherein the requirement that the differences $\Delta_j - D_j^2$ are negative definite operators is enforced by weighing down the discrete first-order derivative operators in the remaining mixed derivatives by a factor, which is slightly smaller than unity, thereby retaining stability.

9. The method according to claim 8, wherein the steps according to claim 8 relieve the specific requirement d. of claim 6 of a strain-consistent source term or initial condition.

10. The method of claim 1 wherein absorbing boundary conditions are implemented by slightly tapering off the wave field at any time step in the proximity of the boundaries of the computational domain.

11. The method of claim 1 wherein the computational grid has uniform grid spacings for each of the $x_j$-coordinates.

12. The method of claim 1 wherein the computational grid has variable grid spacings.

13. The method of claim 3 wherein the second-order temporal derivatives $$\frac{\partial^2 \sigma'_H}{\partial t^2} \text{ and } \frac{\partial^2 \sigma'_V}{\partial t^2}$$

are treated by a second-order divided difference, leading to a three-term time-stepping scheme for numerical evolution of the wave fields after discretization of the spatial differential operator.

14. The method of claim 4 wherein to prevent numerical artifacts, which would be generated for the spatial discretization according to claim 6, in particular for high spatial frequency components of the wave field, discrete second-order derivative operators $\Delta_j$, designed in accordance with claim 4, are used for the non-mixed second-order derivatives with respect to the $x_j$-coordinates, whereupon, to avoid losing stability, each of the differences $\Delta_j - D_j^2$ is a negative definite operator.

15. The method of claim 5 wherein to prevent numerical artifacts, which would be generated for the spatial discretization according to claim 6, in particular for high spatial frequency components of the wave field, discrete second-order derivative operators $\Delta_j$, designed in accordance with claim 4, are used for the non-mixed second-order derivatives with respect to the $x_j$-coordinates, whereupon, to avoid losing stability, each of the differences $\Delta_j - D_j^2$ is a negative definite operator.

* * * * *